(12) United States Patent
Palakodaty et al.

(10) Patent No.: US 7,087,197 B2
(45) Date of Patent: Aug. 8, 2006

(54) PARTICLE FORMATION

(75) Inventors: Srinivas Palakodaty, Foster City, CA (US); Andreas Kordikowski, Skipton (GB); Darren Gilbert, Shipley (GB)

(73) Assignee: Nektar Therapeutics, San Carlos, CA (US)

( * ) Notice: Subject to any disclaimer, the term of this patent is extended or adjusted under 35 U.S.C. 154(b) by 218 days.

(21) Appl. No.: 10/197,689

(22) Filed: Jul. 17, 2002

(65) Prior Publication Data

US 2003/0109421 A1    Jun. 12, 2003

(30) Foreign Application Priority Data

Jul. 20, 2001  (GB) .................................. 0117696.5

(51) Int. Cl.
   *B29B 9/00*    (2006.01)
(52) U.S. Cl. .............................. 264/12; 264/13; 264/14
(58) Field of Classification Search .................... 264/5, 264/7, 11, 12, 13, 14
   See application file for complete search history.

(56) References Cited

U.S. PATENT DOCUMENTS

| | | | |
|---|---|---|---|
| 4,328,107 A | 5/1982 | Wright | 210/703 |
| 4,361,285 A | 11/1982 | Koppehele et al. | 239/424 |
| 4,582,731 A | 4/1986 | Smith | 427/421 |
| 4,702,799 A | 10/1987 | Tuot | 159/48.1 |
| 4,737,384 A | 4/1988 | Murthy et al. | 407/369 |
| 4,919,853 A | 4/1990 | Alvarez et al. | 264/12 |
| 4,923,720 A | 5/1990 | Lee et al. | 427/422 |
| 4,970,093 A | 11/1990 | Sievers et al. | 427/38 |
| 4,977,785 A | 12/1990 | Willoughby et al. | 73/863.12 |
| 5,009,367 A | 4/1991 | Nielsen | 427/87 |
| 5,043,280 A | 8/1991 | Fischer et al. | 435/235.1 |
| 5,106,659 A | 4/1992 | Hastings et al. | 427/421 |
| 5,221,731 A | 6/1993 | Weymans et al. | 528/483 |
| 5,229,486 A | 7/1993 | Paul et al. | 528/483 |
| 5,437,798 A | 8/1995 | LaRoche et al. | 210/761 |
| 5,548,004 A | 8/1996 | Mandel et al. | 523/342 |
| 5,554,382 A | 9/1996 | Castor | 424/450 |
| 5,639,441 A | 6/1997 | Sievers et al. | 424/9.3 |
| 5,707,634 A | 1/1998 | Schmitt | 424/400 |
| 5,708,039 A | 1/1998 | Daly et al. | 521/61 |
| 5,716,558 A | 2/1998 | Nielsen et al. | 264/13 |
| 5,874,029 A * | 2/1999 | Subramaniam et al. | 264/12 |
| 5,981,474 A | 11/1999 | Manning et al. | 514/2 |
| 6,063,910 A | 5/2000 | Debenedetti et al. | 530/418 |

FOREIGN PATENT DOCUMENTS

DE            1078283           3/1960

(Continued)

OTHER PUBLICATIONS

Debenedetti et al., "Application of Supercritical Fluids for the Production of Sustained Delivery Devices," J. Cont. Rel. No. 24, p. 27-44 (1993).

(Continued)

*Primary Examiner*—Mary Lynn Theisen
(74) *Attorney, Agent, or Firm*—Patterson & Sheridan, LLP

(57) ABSTRACT

Method for preparing a target substance in particulate form, comprising introducing into a particle formation vessel, through separate first and second fluid inlets respectively, (a) a "target solution/suspension" of the substance in a fluid vehicle and (b) a compressed fluid anti-solvent, and allowing the anti-solvent to extract the vehicle so as to form particles of the substance, wherein the anti-solvent fluid has a sonic, near-sonic or supersonic velocity as it enters the vessel, and wherein the anti-solvent and the target solution/suspension enter the vessel at different locations and meet downstream (in the direction of anti-solvent flow) of the second fluid inlet. Also provided is apparatus for use in such a method.

10 Claims, 16 Drawing Sheets

FOREIGN PATENT DOCUMENTS

| | | |
|---|---|---|
| DE | 4041563 | 6/1992 |
| EP | 0322687 | 5/1993 |
| EP | 0542314 | 5/1993 |
| GB | 2322326 | 8/1998 |
| JP | 1-176437 | 7/1989 |
| JP | 5-57166 | 3/1993 |
| WO | WO 90/03782 | 4/1990 |
| WO | WO 90/11139 | 10/1990 |
| WO | WO 95/01221 | 1/1995 |
| WO | WO 95/21688 | 8/1995 |
| WO | WO 96/00610 | 1/1996 |

OTHER PUBLICATIONS

Dixon et al., "Polymeric Materials Formed by Precipitation with a Compressed Fluid Antisolvent." AIChE J., vol. 39 (No. 1), p. 127-139 (1993).

Tom et al., "Applications of Supercritical Fluids in the Controlled Release of Drugs," ACS Symposium Series, Supercritical Fluid Engineering Science Fundamentals and Applications, Chpt. 19, p. 238-257 (1993).

Larson et al., "Evaluation of Supercritical Fluid Extraction in the Pharmaceutical Industry." Biotech. Progress, vol. 2 (No. 2), p. 73-82 (1986).

Ullmans Encyclopedia of Industrial Chemistry, vol. B2, Fifth Ed., title page, copyright page, and p. 7-21 and 7-22 (1988).

Tom et al., "Particle Formation with Supercritical Fluids—A Review," J. Aerosol Sci., 1st Ed. vol. 22 (No. 5), p. 555-584 (1981).

Debenedetti et al., "Rapid Expansion of Supercritical Solutions (RESS): Fundamentals and Applications." Fluid Phase Equilibria, vol. 82, p. 311-321 (1993).

Gallagher et al., "Gas AntiSolvent Recrystallization: New Process to Recrystallize Compounds Insoluble in Supercritical Fluids." ACS Symp. Ser No. 406, p. 334-354 (1989).

Lahiere et al., "Mass-Transfer Efficiencies of Column Contactors in Supercritical Extraction Service." Ind. Eng. Chem. Res. No. 26, p. 2086-2092 (1987).

Stahl et al., "Dense Gas Extraction on a Laboratory Scale: A Survey of Some Recent Results," Fluid Phase Equilibria, No. 10, p. 269-278 (1983).

Dill et al., "Denatured States of Proteins," Annu. Rev. Biochem, No. 60, p. 795-825 (1991).

O'Callaghan et al., "Novel Method for Detection of (B)-Lactamases by Using a Chromogenic Cephalosporin Substrate," Antimicrobial Agents and Chemotherapy. vol. 1( No. 4), p. 283-288 (1972).

Jung et al., "Particle Design Using Supercritical Fluids: Literature and Patent Survey," J. of Supercritical Fulids. vol. 20, p. 179-219 (2001).

Bleich et al., "Aerosol Solvent Extraction System—A New Microparticle Production Technique," International J. of Pharmaceutics, vol. 97, p. 111-117 (1993).

Chang et al, "Separation of B-Carotene Mixtures Precipitated from Liquid Solvents with High-Pressure CO2." Biotechnol. Prog., No. 7, p. 275-278 (1991).

Gallagher et al., "Gas Anti-Solvent Recrystallization of RDX: Formation of Ultra-fine Particles of a Difficult-to-Comminute Explosive," TheJ. of Supercritical Fluids, No. 5, p. 130-142 (1992).

Matson et al., "Production of Powders and Films by the Rapid Expansion of Supercritical Solutions," J. of Materials Science, No. 22, p. 1919-1928 (1987).

Mohamed et al., "Solids Formation After the Expansion of Supercritical Mixtures," Supercritical Fluid Science and Technology, Chapter 23, American Chemical Society, p. 355-378 (1989).

Barj et al, "Submicronic MgAl2O4 Powder Synthesis in Supercritical Ethanol," J. of Materials Sci., No. 27, p. 2187-2192 (1992).

Chhor et al., "Synthesis of Submicron TIO2 Powders in Vapor, Liquid and Supercritical Phases, a Comparative Study," Materials Chemistry and Physics, vol. 32, p. 249-254 (1992).

Francis, "Ternary Systems of Liquid Carbon Dioxide," J. of Physical Chemistry, vol. 58, p. 1099-1114 (1954).

Yeo et al., "Formation of Microparticulate Protein Powders Using a Supercritical Fluid Antisolvent," Biotechnology and Bioengineering, vol. 41, p. 341-346 (1993).

Randolph et al., "Sub-Micrometer-Sized Biodegradable Particles of Poly (L-Lactic Acid) via the Gas Antisolvent Spray Precipitation Process," Biotechnol. Prog. vol. 9, No. 4, p. 429-435 (1993).

DeBenedetti et al., "Supercritical Fluids: A New Medium for the Formation of Particles of Biomedical Interest," Proceed. Intern. Symp. Control Rel. Bioact. Mater., 20, p. 141-142 (1993).

Donsi et al., "Micronization by Means of Supercritical Fluids: Possibility of Application to Pharmaceutical Field," Pharm. ACTA HELV, 66, Nr. 5-6, p. 170-173 (1991).

Cygnarowicz et al., "Design and Control of a Process to Extract B-Carotene with Supercritical Carbon Dioxide." Biotechnol. Prog. vol. 6, p. 82-91 (1990).

Chen et al., "Supercritical Antisolvnet Fractionation of Polyethylene Simulated with Multistage Algorithm and SAFTEquation of State: Staging Leads to High Selectivity Enhancements for Light Fractions," Ind. Eng. Chem. Res., vol. 33, p. 306-310 (1994).

Loth et al., "Properites and Dissolution of Drugs Micronized by Crystallization from Supercritical Gases," International J. of Pharmaceuticals, vol. 32, p. 265-267 (1986).

Bodmeier et al., "Polymeric Microspheres Prepared by Spraying Into Compressed Carbon Dioxide," Pharmaceutical Research, vol. 12, No. 8, p. 1211-1217 (1995).

Tom et al., "Formation of Bioerodible Polymeric Microspheres and Microparticles by Rapid Expansion of Supercritical Solutions," Biotechnol. Prog., vol. 7, p.403-411 (1991).

Sanchez et al., "Development of Biodegradable Microspheres and Nanospheres for the Controlled Release of CyclosporinA," International J. of Pharmaceutics, vol. 99, p. 263-273 (1993).

Julienne et al., "Preparation of Poly (D,L-Lactide/Glycolide) Nanoparticles of Controlled Particle Size Distribution: Application of Experimental Designs," Drug Development and Industrial Pharmacy, vol. 18, No. 10, p. 1063-1077 (1992).

Phillips et al, "Rapid Expansion from Supercritical Solutions: Application to Pharmaceutical Processes," International J. of Pharmaceutics, vol. 94, p. 1-10 (1993).

Chang et al., "Precipitation of Microsize Organic Particles from Supercritical Fluids," AIChE Journal. vol. 35, No. 11, p. 1876-1882 (Nov. 1989).

Matson et al., "Rapid Expasion of Supercritical Fluid Solutions: Solute Formation of Powders, Thin Films and Fibers," Ind. Eng. Chem Res., vol. 26, p. 2298-2306 (1987).

Stengers et al., "Carbon Dioxide at its Critical State," Chemical & Engineering News. Jun. 10, 1968.

* cited by examiner

Fig. 1  Enthalpy variation of Carbon dioxide with temperature and pressure

| STATISTICS | PARAMETERS | % UNDER | SIZE | % UNDER | SIZE |
|---|---|---|---|---|---|
| Mean Size : 2.709 | Material : Assumed | 5% | 0.9139 | 55% | 2.929 |
| Standard Deviation : 1.826 | Density : 1.30 | 10% | 1.224 | 60% | 3.156 |
| D (4,3) : 3.211 | Run length (sec) : 280.5 | 15% | 1.486 | 65% | 3.419 |
| D (3,2) : 2.236 | Meas. Range : Standard | 20% | 1.705 | 70% | 3.728 |
| Mode (Linear scale) : 2.31 | Sum of channels : 327906 | 25% | 1.894 | 75% | 4.101 |
| Specific Surface Area : 2.06 sq mtres/g | Lower Size Limit : 0.10 | 30% | 2.066 | 80% | 4.560 |
| | Upper size limit : 200.00 | 35% | 2.228 | 85% | 5.135 |
| Scans 21 and 22 combined between | | 40% | 2.388 | 90% | 5.926 |
| 3.3 and 3.4 microns | | 45% | 2.553 | 95% | 7.233 |
| | Regularization : High | 50% | 2.731 | | |

| UPPER SIZE | % IN | LOWER SIZE | % UNDER | UPPER SIZE | % IN | LOWER SIZE | % UNDER |
|---|---|---|---|---|---|---|---|
| | | | | 100 | 0.0000 | 86.0 | 100.00 |
| | | | | 86.0 | 0.0000 | 74.0 | 100.00 |
| | | | | 74.0 | 0.0000 | 63.0 | 100.00 |
| | | | | 63.0 | 0.0000 | 54.0 | 100.00 |
| | | | | 54.0 | 0.0000 | 46.0 | 100.00 |
| | | | | 46.0 | 0.0000 | 40.0 | 100.00 |
| | | | | 40.0 | 0.0000 | 34.0 | 100.00 |
| | | | | 34.0 | 0.0000 | 29.0 | 100.00 |
| | | | | 29.0 | 0.0000 | 25.0 | 100.00 |
| | | | | 25.0 | 0.0000 | 22.0 | 100.00 |
| | | | | 22.0 | 0.0000 | 18.0 | 100.00 |
| 180 | 0.0000 | 160 | 100.00 | 18.0 | 0.0000 | 16.0 | 100.00 |
| 160 | 0.0000 | 140 | 100.00 | 16.0 | 0.0000 | 14.0 | 100.00 |
| 140 | 0.0000 | 120 | 100.00 | 14.0 | 0.0000 | 12.0 | 100.00 |
| 120 | 0.0000 | 100 | 100.00 | 12.0 | 0.0899 | 10.0 | 99.910 |

| UPPER SIZE | % IN | LOWER SIZE | % UNDER | UPPER SIZE | % IN | LOWER SIZE | % UNDER |
|---|---|---|---|---|---|---|---|
| 10.0 | 1.6301 | 8.60 | 98.280 | 1.00 | 2.0851 | 0.86 | 4.2188 |
| 8.60 | 2.8033 | 7.40 | 95.477 | 0.86 | 1.6019 | 0.74 | 2.6169 |
| 7.40 | 3.6885 | 6.30 | 91.788 | 0.74 | 1.2153 | 0.63 | 1.4015 |
| 6.30 | 4.8937 | 5.40 | 86.894 | 0.63 | 0.7254 | 0.54 | 0.6761 |
| 5.40 | 6.5133 | 4.60 | 80.381 | 0.54 | 0.4008 | 0.46 | 0.2753 |
| 4.60 | 6.6332 | 4.00 | 73.748 | 0.46 | 0.1639 | 0.40 | 0.1114 |
| 4.00 | 9.0833 | 3.40 | 64.665 | 0.40 | 0.0780 | 0.34 | 0.0334 |
| 3.40 | 10.348 | 2.90 | 54.317 | 0.34 | 0.0251 | 0.29 | 0.0083 |
| 2.90 | 10.898 | 2.50 | 43.419 | 0.29 | 0.0065 | 0.25 | 0.0018 |
| 2.50 | 9.2925 | 2.20 | 34.127 | 0.25 | 0.0014 | 0.22 | 0.0004 |
| 2.20 | 11.690 | 1.80 | 22.437 | 0.22 | 0.0004 | 0.18 | 0.0000 |
| 1.80 | 4.9377 | 1.60 | 17.499 | 0.18 | 0.0000 | 0.16 | 0.0000 |
| 1.60 | 4.2475 | 1.40 | 13.252 | 0.16 | 0.0000 | 0.14 | 0.0000 |
| 1.40 | 3.6690 | 1.20 | 9.5828 | 0.14 | 0.0000 | 0.12 | 0.0000 |
| 1.20 | 3.2789 | 1.00 | 6.3039 | 0.12 | 0.0000 | 0.10 | 0.0000 |

Fig. 10B

| PARAMETERS | | DISPERSER CONTROL | | % UNDER | SIZE | % UNDER | SIZE |
|---|---|---|---|---|---|---|---|
| Material | : Salmeterol | Disperser Type | : AeroDisperser | 5% | 0.8572 | 55% | 2.461 |
| Density | : 1.25 | Shear Force | : 0.5, 0.1 psi | 10% | 1.057 | 60% | 2.672 |
| Run Length (sec) | : 180.2 | Feed Rate | : 5000, 1000 | 15% | 1.221 | 65% | 2.936 |
| Measurement Range | : Standard | | | 20% | 1.371 | 70% | 3.289 |
| Laser Current (mA) | : 48.6 | Deagglomeration | : Normal | 25% | 1.515 | 75% | 3.755 |
| | | Pin Vibration | : On | 30% | 1.658 | 80% | 4.338 |
| Sum of Channels | : 94710 | | | 35% | 1.804 | 85% | 5.020 |
| Lower Size Limit | : 0.10 | | | 40% | 1.954 | 90% | 5.786 |
| Upper Size Limit | : 199.60 | | | 45% | 2.112 | 95% | 6.607 |
| | | SCANS 37 AND 38 COMBINED BETWEEN 3.1 & 3.2 MICRONS | | 50% | 2.278 | | |
| Mean Size | : 2.351 | D (4,3) | : 2.839 | Mode (Linear Scale) : 1.53 | | | |
| Standard Deviation | : 1.863 | D (3,2) | : 1.942 | Spec surf area : | 2.47 sq meter/g | | |

| UPPER SIZE | % IN | LOWER SIZE | % UNDER | UPPER SIZE | % IN | LOWER SIZE | % UNDER |
|---|---|---|---|---|---|---|---|
| | | | | 100 | 0.0000 | 86.0 | 100.0 |
| | | | | 86.0 | 0.0000 | 74.0 | 100.0 |
| | | | | 74.0 | 0.0000 | 63.0 | 100.0 |
| | | | | 63.0 | 0.0000 | 54.0 | 100.0 |
| | | | | 54.0 | 0.0000 | 46.0 | 100.0 |
| | | | | 46.0 | 0.0000 | 40.0 | 100.0 |
| | | | | 40.0 | 0.0000 | 34.0 | 100.0 |
| | | | | 34.0 | 0.0000 | 29.0 | 100.0 |
| | | | | 29.0 | 0.0000 | 25.0 | 100.0 |
| | | | | 25.0 | 0.0000 | 22.0 | 100.0 |
| | | | | 22.0 | 0.0000 | 18.0 | 100.0 |
| 180 | 0.0000 | 160 | 100.00 | 18.0 | 0.0000 | 16.0 | 100.0 |
| 160 | 0.0000 | 140 | 100.00 | 16.0 | 0.0000 | 14.0 | 100.0 |
| 140 | 0.0000 | 120 | 100.00 | 14.0 | 0.0000 | 12.0 | 100.0 |
| 120 | 0.0000 | 100 | 100.00 | 12.0 | 0.0000 | 10.0 | 100.0 |

| UPPER SIZE | % IN | LOWER SIZE | % UNDER | UPPER SIZE | % IN | LOWER SIZE | % UNDER |
|---|---|---|---|---|---|---|---|
| 10.0 | 0.0000 | 8.60 | 100.00 | 1.00 | 3.3796 | 0.86 | 5.0609 |
| 8.60 | 1.4906 | 7.40 | 98.509 | 0.86 | 2.2618 | 0.74 | 2.7992 |
| 7.40 | 5.2598 | 6.30 | 93.250 | 0.74 | 1.4505 | 0.63 | 1.3487 |
| 6.30 | 5.7050 | 5.40 | 87.545 | 0.63 | 0.7338 | 0.54 | 0.6149 |
| 5.40 | 5.5227 | 4.60 | 82.022 | 0.54 | 0.3699 | 0.46 | 0.2450 |
| 4.60 | 4.8171 | 4.00 | 77.205 | 0.46 | 0.1450 | 0.40 | 0.1000 |
| 4.00 | 5.9042 | 3.40 | 71.300 | 0.40 | 0.0689 | 0.34 | 0.0311 |
| 3.40 | 6.9139 | 2.90 | 64.387 | 0.34 | 0.0228 | 0.29 | 0.0083 |
| 2.90 | 8.3969 | 2.50 | 55.990 | 0.29 | 0.0062 | 0.25 | 0.0021 |
| 2.50 | 8.3031 | 2.20 | 47.687 | 0.25 | 0.0015 | 0.22 | 0.0005 |
| 2.20 | 12.823 | 1.80 | 34.863 | 0.22 | 0.0005 | 0.18 | 0.0000 |
| 1.80 | 6.8871 | 1.60 | 27.976 | 0.18 | 0.0000 | 0.16 | 0.0000 |
| 1.60 | 6.9826 | 1.40 | 20.994 | 0.16 | 0.0000 | 0.14 | 0.0000 |
| 1.40 | 6.6636 | 1.20 | 14.330 | 0.14 | 0.0000 | 0.12 | 0.0000 |
| 1.20 | 5.8895 | 1.00 | 8.4406 | 0.12 | 0.0000 | 0.10 | 0.0000 |

Fig. 11B

| STATISTICS | | PARAMETERS | | % UNDER | SIZE | % UNDER | SIZE |
|---|---|---|---|---|---|---|---|
| Mean size | : 2.939 | Material | : Assumed | 5% | 0.8774 | 55% | 3.296 |
| Standard Deviation | : 1.968 | Density | : 1.30 | 10% | 1.180 | 60% | 3.621 |
| D (4, 3) | : 3.631 | Run Length (sec) | : 291.8 | 15% | 1.448 | 65% | 3.976 |
| D (3, 2) | : 2.309 | Meas. Range | : Standard | 20% | 1.683 | 70% | 4.378 |
| Mode (Linear scale) | : 2.07 | Sum of channels | : 396435 | 25% | 1.894 | 75% | 4.853 |
| Specific Surface Area | : 2.00 sq mtrs/g | Lower Size Limit | : 0.10 | 30% | 2.095 | 80% | 5.434 |
| | | Upper Size Limit | : 200.00 | 35% | 2.297 | 85% | 6.164 |
| Scans 23 and 24 combined between: | | | | 40% | 2.511 | 90% | 7.117 |
| 2.9 and 3.0 microns | | | | 45% | 2.742 | 95% | 8.507 |
| | | | | 50% | 3.000 | | |
| | | Regularization | : HIGH | | | | |

| UPPER SIZE | % IN | LOWER SIZE | % UNDER | UPPER SIZE | % IN | LOWER SIZE | % UNDER |
|---|---|---|---|---|---|---|---|
| | | | | 100 | 0.0000 | 86.0 | 100.00 |
| | | | | 86.0 | 0.0000 | 74.0 | 100.00 |
| | | | | 74.0 | 0.0000 | 63.0 | 100.00 |
| | | | | 63.0 | 0.0000 | 54.0 | 100.00 |
| | | | | 54.0 | 0.0000 | 46.0 | 100.00 |
| | | | | 46.0 | 0.0000 | 40.0 | 100.00 |
| | | | | 40.0 | 0.0000 | 34.0 | 100.00 |
| | | | | 34.0 | 0.0000 | 29.0 | 100.00 |
| | | | | 29.0 | 0.0000 | 25.0 | 100.00 |
| | | | | 25.0 | 0.0000 | 22.0 | 100.00 |
| | | | | 22.0 | 0.0000 | 18.0 | 100.00 |
| 180 | 0.0000 | 160 | 100.00 | 18.0 | 0.0000 | 16.0 | 100.00 |
| 160 | 0.0000 | 140 | 100.00 | 16.0 | 0.0000 | 14.0 | 100.00 |
| 140 | 0.0000 | 120 | 100.00 | 14.0 | 0.0000 | 12.0 | 100.00 |
| 120 | 0.0000 | 100 | 100.00 | 12.0 | 1.6637 | 10.0 | 98.336 |

| UPPER SIZE | % IN | LOWER SIZE | % UNDER | UPPER SIZE | % IN | LOWER SIZE | % UNDER |
|---|---|---|---|---|---|---|---|
| 10.0 | 3.0897 | 8.60 | 95.247 | 1.00 | 2.2311 | 0.86 | 4.7306 |
| 8.60 | 4.0266 | 7.40 | 91.220 | 0.86 | 1.7386 | 0.74 | 2.9921 |
| 7.40 | 5.4088 | 6.30 | 85.811 | 0.74 | 1.3373 | 0.63 | 1.6548 |
| 6.30 | 6.0737 | 5.40 | 79.737 | 0.63 | 0.8239 | 0.54 | 0.8309 |
| 5.40 | 7.2891 | 4.60 | 72.448 | 0.54 | 0.4784 | 0.46 | 0.3525 |
| 4.60 | 7.1310 | 4.00 | 65.317 | 0.46 | 0.2055 | 0.40 | 0.1470 |
| 4.00 | 8.6704 | 3.40 | 56.647 | 0.40 | 0.1016 | 0.34 | 0.0454 |
| 3.40 | 8.4938 | 2.90 | 48.153 | 0.34 | 0.0335 | 0.29 | 0.0119 |
| 2.90 | 8.4054 | 2.50 | 39.748 | 0.29 | 0.0092 | 0.25 | 0.0027 |
| 2.50 | 7.1267 | 2.20 | 32.621 | 0.25 | 0.0021 | 0.22 | 0.0006 |
| 2.20 | 9.9017 | 1.80 | 22.719 | 0.22 | 0.0005 | 0.18 | 0.0000 |
| 1.80 | 4.5590 | 1.60 | 18.160 | 0.18 | 0.0000 | 0.16 | 0.0000 |
| 1.60 | 4.1154 | 1.40 | 14.045 | 0.16 | 0.0000 | 0.14 | 0.0000 |
| 1.40 | 3.6886 | 1.20 | 10.356 | 0.14 | 0.0000 | 0.12 | 0.0000 |
| 1.20 | 3.3945 | 1.00 | 6.9617 | 0.12 | 0.0000 | 0.10 | 0.0000 |

Fig. 12B

| STATISTICS | | PARAMETERS | | % UNDER | SIZE | % UNDER | SIZE |
|---|---|---|---|---|---|---|---|
| Mean Size | : 1.614 | Material | : Assumed | 5% | 0.6527 | 55% | 1.132 |
| Standard Deviation | : 2.430 | Density | : 1.30 | 10% | 0.7273 | 60% | 1.214 |
| D (4, 3) | : 2.540 | Run Length (sec) | : 296.3 | 15% | 0.7801 | 65% | 1.360 |
| D (3, 2) | : 1.208 | Meas. Range | : Standard | 20% | 0.8242 | 70% | 1.874 |
| Mode (Linear Scale) | : 0.91 | Sum of Channels | : 435306 | 25% | 0.8641 | 75% | 3.509 |
| Specific Surface Area | : 3.82 sq mtre/g | Lower Size limit | : 0.10 | 30% | 0.9024 | 80% | 5.091 |
| | | Upper Size Limit | : 200.00 | 35% | 0.9406 | 85% | 6.316 |
| Scans 55 and 56 combined Between: | | | | 40% | 0.9803 | 90% | 7.626 |
| 1.3 and 1.3 microns | | | | 45% | 1.023 | 95% | 8.698 |
| | | | | 50% | 1.072 | | |
| | | Regularization | : High | | | | |

| UPPER SIZE | % IN | LOWER SIZE | % UNDER | UPPER SIZE | % IN | LOWER SIZE | % UNDER |
|---|---|---|---|---|---|---|---|
| | | | | 100 | 0.0000 | 86.0 | 100.00 |
| | | | | 86.0 | 0.0000 | 74.0 | 100.00 |
| | | | | 74.0 | 0.0000 | 63.0 | 100.00 |
| | | | | 63.0 | 0.0000 | 54.0 | 100.00 |
| | | | | 54.0 | 0.0000 | 46.0 | 100.00 |
| | | | | 46.0 | 0.0000 | 40.0 | 100.00 |
| | | | | 40.0 | 0.0000 | 34.0 | 100.00 |
| | | | | 34.0 | 0.0000 | 29.0 | 100.00 |
| | | | | 29.0 | 0.0000 | 25.0 | 100.00 |
| | | | | 25.0 | 0.0000 | 22.0 | 100.00 |
| | | | | 22.0 | 0.0000 | 18.0 | 100.00 |
| 180 | 0.0000 | 160 | 100.00 | 18.0 | 0.0000 | 16.0 | 100.00 |
| 160 | 0.0000 | 140 | 100.00 | 16.0 | 0.0000 | 14.0 | 100.00 |
| 140 | 0.0000 | 120 | 100.00 | 14.0 | 0.0000 | 12.0 | 100.00 |
| 120 | 0.0000 | 100 | 100.00 | 12.0 | 0.5869 | 10.0 | 99.413 |

| UPPER SIZE | % IN | LOWER SIZE | % UNDER | UPPER SIZE | % IN | LOWER SIZE | % UNDER |
|---|---|---|---|---|---|---|---|
| 10.0 | 4.8511 | 8.60 | 94.562 | 1.00 | 17.890 | 0.86 | 24.465 |
| 8.60 | 5.4658 | 7.40 | 89.096 | 0.86 | 13.373 | 0.74 | 11.092 |
| 7.40 | 4.1636 | 6.30 | 84.933 | 0.74 | 7.1644 | 0.63 | 3.9281 |
| 6.30 | 3.7357 | 5.40 | 81.197 | 0.63 | 2.6277 | 0.54 | 1.3004 |
| 5.40 | 2.8737 | 4.60 | 78.323 | 0.54 | 0.9271 | 0.46 | 0.3733 |
| 4.60 | 1.8486 | 4.00 | 76.475 | 0.46 | 0.2646 | 0.40 | 0.1087 |
| 4.00 | 1.7900 | 3.40 | 74.685 | 0.40 | 0.0895 | 0.34 | 0.0192 |
| 3.40 | 1.4904 | 2.90 | 73.194 | 0.34 | 0.0166 | 0.29 | 0.0025 |
| 2.90 | 1.1886 | 2.50 | 72.006 | 0.29 | 0.0022 | 0.25 | 0.0004 |
| 2.50 | 0.8609 | 2.20 | 71.145 | 0.25 | 0.0003 | 0.22 | 0.0001 |
| 2.20 | 1.4865 | 1.80 | 69.658 | 0.22 | 0.0001 | 0.18 | 0.0000 |
| 1.80 | 1.2945 | 1.60 | 68.364 | 0.18 | 0.0000 | 0.16 | 0.0000 |
| 1.60 | 2.5388 | 1.40 | 65.825 | 0.16 | 0.0000 | 0.14 | 0.0000 |
| 1.40 | 6.5491 | 1.20 | 59.276 | 0.14 | 0.0000 | 0.12 | 0.0000 |
| 1.20 | 16.920 | 1.00 | 42.356 | 0.12 | 0.0000 | 0.10 | 0.0000 |

Fig. 15B

| STATISTICS | | PARARMETERS | | % UNDER | SIZE | % UNDER | SIZE |
|---|---|---|---|---|---|---|---|
| Mean Size | : 1.142 | Material | : Assumed | 5% | 0.6054 | 55% | 1.040 |
| Standard Deviation | : 1.823 | Density | : 1.30 | 10% | 0.6840 | 60% | 1.081 |
| d (4, 3) | : 1.481 | Run Length | : 291.4 | 15% | 0.7390 | 65% | 1.128 |
| D (3, 2) | : 1.003 | Meas. range | : Standard | 20% | 0.7841 | 70% | 1.182 |
| Mode (Linear Scale) | : 0.92 | Sum of Channels | : 352616 | 25% | 0.8239 | 75% | 1.249 |
| Specific Surface Area | : 4.60 sq mtre/g | Lower Size Limit | : 0.10 | 30% | 0.8608 | 80% | 1.341 |
| | | Upper Size Limit | : 200.00 | 35% | 0.8961 | 85% | 1.500 |
| Scans 53 and 54 combined between: | | | | 40% | 0.9309 | 90% | 2.170 |
| 1.6 and 1.6 microns | | | | 45% | 0.9659 | 95% | 6.033 |
| | | | | 50% | 1.002 | | |
| | | Regularization | : High | | | | |

| UPPER SIZE | % IN | LOWER SIZE | % UNDER | UPPER SIZE | % IN | LOWER SIZE | % UNDER |
|---|---|---|---|---|---|---|---|
| | | | | 100 | 0.0000 | 86.0 | 100.00 |
| | | | | 86.0 | 0.0000 | 74.0 | 100.00 |
| | | | | 74.0 | 0.0000 | 63.0 | 100.00 |
| | | | | 63.0 | 0.0000 | 54.0 | 100.00 |
| | | | | 54.0 | 0.0000 | 46.0 | 100.00 |
| | | | | 46.0 | 0.0000 | 40.0 | 100.00 |
| | | | | 40.0 | 0.0000 | 34.0 | 100.00 |
| | | | | 34.0 | 0.0000 | 29.0 | 100.00 |
| | | | | 29.0 | 0.0000 | 25.0 | 100.00 |
| | | | | 25.0 | 0.0000 | 22.0 | 100.00 |
| | | | | 22.0 | 0.0000 | 18.0 | 100.00 |
| 180 | 0.0000 | 160 | 100.00 | 18.0 | 0.0000 | 16.0 | 100.00 |
| 160 | 0.0000 | 140 | 100.00 | 16.0 | 0.0000 | 14.0 | 100.00 |
| 140 | 0.0000 | 120 | 100.00 | 14.0 | 0.0000 | 12.0 | 100.00 |
| 120 | 0.0000 | 100 | 100.00 | 12.0 | 0.0000 | 10.0 | 100.00 |

| UPPER SIZE | % IN | LOWER SIZE | % UNDER | UPPER SIZE | % IN | LOWER SIZE | % UNDER |
|---|---|---|---|---|---|---|---|
| 10.0 | 0.2188 | 8.60 | 99.781 | 1.00 | 19.844 | 0.86 | 29.888 |
| 8.60 | 2.6516 | 7.40 | 97.130 | 0.86 | 14.784 | 0.74 | 15.104 |
| 7.40 | 1.7212 | 6.30 | 95.408 | 0.74 | 8.7965 | 0.63 | 6.3079 |
| 6.30 | 1.3966 | 5.40 | 94.012 | 0.63 | 3.8225 | 0.54 | 2.4854 |
| 5.40 | 1.1490 | 4.60 | 92.863 | 0.54 | 1.6281 | 0.46 | 0.8573 |
| 4.60 | 0.6032 | 4.00 | 92.260 | 0.46 | 0.5529 | 0.40 | 0.3044 |
| 4.00 | 0.5967 | 3.40 | 91.663 | 0.40 | 0.2273 | 0.34 | 0.0772 |
| 3.40 | 0.5426 | 2.90 | 91.120 | 0.34 | 0.0613 | 0.29 | 0.0158 |
| 2.90 | 0.5080 | 2.50 | 90.612 | 0.29 | 0.0131 | 0.25 | 0.0027 |
| 2.50 | 0.5423 | 2.20 | 90.070 | 0.25 | 0.0022 | 0.22 | 0.0005 |
| 2.20 | 1.5044 | 1.80 | 88.566 | 0.22 | 0.0005 | 0.18 | 0.0000 |
| 1.80 | 1.8714 | 1.60 | 86.694 | 0.18 | 0.0000 | 0.16 | 0.0000 |
| 1.60 | 4.4032 | 1.40 | 82.291 | 0.16 | 0.0000 | 0.14 | 0.0000 |
| 1.40 | 10.802 | 1.20 | 71.489 | 0.14 | 0.0000 | 0.12 | 0.0000 |
| 1.20 | 21.757 | 1.00 | 49.732 | 0.12 | 0.0000 | 0.10 | 0.0000 |

Fig. 16B

PARTICLE FORMATION

FIELD OF THE INVENTION

This invention relates to methods and apparatus for forming particles of a target substance.

BACKGROUND TO THE INVENTION

It is known to use a compressed fluid, typically a supercritical or near-critical fluid, as an anti-solvent to precipitate particles of a substance of interest (a "target substance") from solution or suspension. The basic technique is known as "GAS" (Gas Anti-Solvent) precipitation [Gallagher et al, "Supercritical Fluid Science and Technology", ACS Symp. Ser., 406, p334 (1989)]. Versions of it have been disclosed for instance in EP-0 322 687 and WO-90/03782, which are hereby incorporated in their entirety by reference.

In one particular version known as SEDS™ (Solution Enhanced Dispersion by Supercritical fluids), a target substance is dissolved or suspended in an appropriate fluid vehicle, and the resulting "target solution/suspension" then co-introduced into a particle formation vessel with an anti-solvent fluid (usually supercritical) in which the vehicle is soluble. The co-introduction is effected in a particular way, such that:

the target solution/suspension and the anti-solvent both meet and enter the vessel at substantially the same point; and at that point, the mechanical energy of the anti-solvent serves to disperse the target solution/suspension (i.e., to break it up into individual fluid elements) at the same time as the anti-solvent extracts the vehicle so as to cause particle formation.

Thus, in SEDS™, the compressed fluid serves not only as an anti-solvent but also as a mechanical dispersing agent. The simultaneity of fluid contact, dispersion and particle formation provides a high degree of control over the physicochemical properties of the particulate product.

Versions of SEDS™ are described in WO-95/01221, WO-96/00610, WO-98/36825, WO-99/44733, WO-99/59710, WO-01/03821, WO-01/15664 and WO-02/38127. Other SEDS™ processes are described in WO-99/52507, WO-99/52550, WO-00/30612, WO-00/30613 and WO-00/67892, all of which are hereby incorporated in their entirety by reference Another version of the GAS technique is described in WO-97/31691, in which a special form of two-fluid nozzle is used to introduce a "target solution/suspension" and an energising gas into a particle formation vessel containing a supercritical anti-solvent. The energising gas can be the same as the anti-solvent fluid. Within the nozzle, a restriction generates sonic waves in the energising gas/anti-solvent flow and focusses them back (i.e., in a direction opposite to that of the energising gas flow) on the outlet of the target solution/suspension passage, resulting in mixing of the fluids within the nozzle before they enter the particle formation vessel. It is suggested that where the energising gas is the same as the anti-solvent (typically supercritical carbon dioxide), its flow rate could be sufficiently high to obtain a sonic velocity at the nozzle outlet. However, the authors do not appear ever to have achieved such high velocities in their experimental examples.

Other modifications have been made to the basic GAS process in order to affect atomisation of the target solution/suspension at the point of its contact with the compressed fluid anti-solvent. For example, U.S. Pat. No. 5,770,559 describes a GAS precipitation process in which a target solution is introduced, using a sonicated spray nozzle, into a pressure vessel containing a supercritical or near-critical anti-solvent fluid—see also Randolph et al in Biotechnol. Prog., 1993, 9, 429–435.

It would be generally desirable to provide alternative particle formation techniques which combined one or more of the advantages of the prior art methods with a broader applicability (for instance, for a wider range of target substances, vehicles and/or anti-solvents) and/or a higher degree of control over the product characteristics. In particular it is generally desirable, especially for pharmaceutical substances, to be able to produce small (even submicron) particles with narrow size distributions.

STATEMENTS OF THE INVENTION

According to a first aspect of the present invention there is provided a method for preparing a target substance in particulate form, the method comprising introducing into a particle formation vessel, through separate first and second fluid inlet means respectively, (a) a solution or suspension of the target substance in a fluid vehicle (the "target solution/suspension") and (b) a compressed fluid anti-solvent for the substance, and allowing the anti-solvent fluid to extract the vehicle from the target solution/suspension so as to form particles of the target substance, wherein the anti-solvent fluid has a sonic, near-sonic or supersonic velocity as it enters the particle formation vessel, and wherein the anti-solvent and the target solution/suspension enter the particle formation vessel at different locations and meet downstream (in the direction of anti-solvent flow) of the second fluid inlet means.

By "sonic velocity" and "supersonic velocity" is meant respectively that the velocity of the anti-solvent fluid as it enters the vessel is the same as or greater than the velocity of sound in that fluid at that point. By "near-sonic velocity" is meant that the anti-solvent velocity on entry into the vessel is slightly lower than, but close to, the velocity of sound in that fluid at that point—for instance its "Mach number" M (the ratio of its actual speed to the speed of sound) is greater than 0.8, preferably greater than 0.9 or 0.95. Generally speaking, in the method of the invention, the Mach number for the anti-solvent fluid on entering the particle formation vessel may be between 0.8 and 1.5, preferably between 0.9 and 1.3.

A near-sonic, sonic or supersonic anti-solvent velocity may be achieved by selecting appropriate operating conditions, in particular the temperature and pressure of the fluid as it enters the particle formation vessel, the temperature and pressure within the vessel (which may be controlled in conventional manner, for instance using an oven and a back pressure regulator) and the geometry (in particular size) of the inlet through which the anti-solvent is introduced into the vessel.

References in this specification to a fluid entering a vessel are to the fluid exiting an inlet means (for example, a nozzle) used to introduce the fluid into the vessel. For these purposes, therefore, the inlet means is to be considered as upstream of the vessel in the direction of fluid flow, although parts of it (in particular its outlet) may be located physically within the vessel.

There needs to be a drop in pressure as the anti-solvent fluid enters the particle formation vessel. This is typically achieved by imparting a relatively high "back pressure" to the anti-solvent (by using a high anti-solvent flow rate and forcing it through a restriction such as a nozzle) and maintaining the vessel at a significantly lower pressure.

However, this pressure reduction can cause undesirable Joule-Thomson cooling of the anti-solvent. Accordingly, the temperature of the anti-solvent upstream of the particle formation vessel needs to be sufficiently high that the fluid remains at an appropriate temperature (typically above its critical temperature $T_c$), even after expanding into the particle formation vessel. The method of the invention thus preferably includes pre-heating the anti-solvent fluid, upstream of the particle formation vessel, to a temperature such as to compensate for its Joule-Thomson cooling as it enters the vessel.

Thus, the first aspect of the present invention may be seen as a method for preparing a target substance in particulate form, the method comprising introducing into a particle formation vessel (a) a solution or suspension of the target substance in a fluid vehicle (the "target solution/suspension") and (b) a compressed fluid anti-solvent for the substance, and allowing the anti-solvent fluid to extract the vehicle from the target solution/suspension so as to form particles of the target substance, wherein (i) the pressure in the particle formation vessel is $P_1$ which is preferably greater than the critical pressure $P_c$ of the anti-solvent, (ii) the anti-solvent is introduced through a restricted inlet so as to have a back pressure of $P_2$, where $P_2$ is greater than $P_1$, (iii) the temperature in the particle formation vessel is $T_1$ which is preferably greater than the critical temperature $T_c$ of the anti-solvent, (iv) the anti-solvent is introduced into the vessel at a temperature $T_2$, where $T_2$ is greater than $T_1$, (v) $T_1$ and $T_2$ are such that Joule-Thomson cooling of the anti-solvent as it enters the vessel does not reduce the anti-solvent temperature to below that required of it at the point of particle formation (and are preferably such that the anti-solvent temperature does not fall below $T_c$ within the vessel) and (vi) $P_1$, $P_2$, $T_1$ and $T_2$ are such that the anti-solvent fluid has a sonic, near-sonic or supersonic velocity as it enters the particle formation vessel.

Again the anti-solvent and the target solution/suspension must be introduced separately into the particle formation vessel and contact each other downstream of (preferably immediately downstream of) the point of anti-solvent entry into the vessel.

The anti-solvent expansion as it enters the particle formation vessel is isenthalpic. Thus, an appropriate temperature for the anti-solvent upstream of the vessel may be derived from enthalpy charts for the fluid, for instance as illustrated for carbon dioxide in FIG. 1. (For $CO_2$, the critical temperature $T_c$ is 31° C. (304 K) and the critical pressure $P_c$ is 74 bar.) FIG. 1 shows how, when working with a pressure reduction from 300 to 80 bar for the $CO_2$ on entering the particle formation vessel, the upstream temperature should be at least 360 K (87° C.) to achieve an appropriate temperature of 308 K (35° C.) or greater when the $CO_2$ enters the vessel.

Thus, a carbon dioxide anti-solvent is preferably introduced with an upstream temperature of 80° C. (353 K) or higher, more preferably between 80° C. and 170° C. (443 K).

The pressures and temperatures needed to ensure a near-sonic, sonic or supersonic velocity depend on the nature of the anti-solvent fluid. In the case of a carbon dioxide anti-solvent, for instance, in order to achieve a sonic or supersonic velocity the operating conditions must satisfy the formula:

$$\frac{p_o}{p_i} \leq \left[\frac{2}{k+1}\right]^{\frac{k}{k-1}}$$

where $p_i$ is the $CO_2$ pressure upstream of entry into the particle formation vessel and $p_o$ is the $CO_2$ pressure immediately on entry into the vessel, and k is the ratio of the specific heats of $CO_2$ at constant pressure ($C_p$) and constant volume ($C_v$).

So, for example the $CO_2$ may be introduced at a temperature of 360 K (87° C.) with an inlet pressure $p_i$ of 300 bar, and the vessel may be at 310 K (37° C.) and 80 bar (i.e., the outlet pressure $p_o$ is 80 bar). At 310 K and 80 bar, k for $CO_2$ is 8.78[1]. At 360 K and 300 bar, k is 2.29[1]. Taking a geometric average for k of 4.48, as the $CO_2$ exits the nozzle, then substituting these values into the above equation gives $$\frac{p_o}{p_i} = 0.267 \text{ and } \left[\frac{2}{k+1}\right]^{\frac{k}{k-1}} = 0.274,$$

which confirms that the $CO_2$ flow is supersonic irrespective of the $CO_2$ flow rate into the vessel, so long as there is an appropriate pressure differential between $p_i$ and $p_o$. A suitable $CO_2$ flow might be for instance between 170 and 200 g/min. A suitable pressure drop as the $CO_2$ enters the particle formation vessel might be between 170 and 250 bar.

[1] International thermodynamic tables of the fluid state—3. Carbon dioxide, Angus et al, Pergamon Press, 1976

An alternative method for calculating the anti-solvent velocity (again for carbon dioxide, using the same operating conditions as above but with a vessel temperature of 40° C., and introducing the $CO_2$ through a nozzle of outlet diameter 0.2 mm) is:

(i) density of $CO_2$ at 310 K and 80 bar[1] is 0.33088 g/cm$^3$,
(ii) therefore, volumetric flow of $CO_2$ at 200 g/min (Q) is 200/0.33088=604.45 cm$^3$/min.
(iii) Surface area (A) of the nozzle=3.14×10$^{-4}$ cm$^2$,
(iv) therefore velocity of $CO_2$=Q÷(A×60×100)=320.7 m/s.
(v) Speed of sound in $CO_2$ at 310 K and 80 bar[1] is 196.8 m/s.
(vi) Thus, the $CO_2$ velocity is confirmed as being supersonic under such conditions.

[1] International thermodynamic tables of the fluid state—3. Carbon dioxide, Angus et al, Pergamon Press, 1976

Although we do not wish to be bound by this theory, it is believed that in the method of the invention, a so-called "Mach disk" is generated in the anti-solvent flow downstream of the second fluid inlet means. In this region the fluid velocity will change abruptly to sub-sonic thus generating shock waves in the fluids present (in effect a continuous, low volume, supersonic boom). These shock waves are thought to aid mixing and dispersion of the target solution/suspension with the anti-solvent. It is unlikely that the waves will be ultrasonic as in for example the system described in WO-97/31691. Moreover they will propagate in the direction of the anti-solvent flow, rather than in a counter-current sense as in for instance the nozzle described in WO-97/31691 which reflects a sonic wave back towards a source of energising gas.

The arrangement of the first and second inlet means will preferably be such that the Mach disk is generated upstream (in the direction of anti-solvent flow) of the point of entry of the target solution/suspension into the particle formation vessel. It should occur in line with the longitudinal axis of the second inlet means, i.e., in line with the direction of anti-solvent flow.

The near-sonic, sonic or supersonic anti-solvent velocity is ideally achieved, in the method of the present invention, simply by the use of appropriate anti-solvent flow rates, back pressures and/or operating temperatures, and without the aid of mechanical, electrical and/or magnetic input such as for example from impellers, impinging surfaces especially within the anti-solvent introducing means, electrical transducers and the like. Introducing the anti-solvent via a convergent nozzle, ideally as a single fluid stream, may also help in the achievement of appropriate fluid velocities. Further "energising" fluid streams, such as those required in the method of WO-97/31691, are not then needed in order to achieve the desired level of control over the contact between the target solution/suspension and the anti-solvent fluid.

The use of near-sonic, sonic or supersonic anti-solvent velocities can allow achievement of smaller particle sizes and narrower size distributions in GAS-based particle formation processes. In particular it can allow the formation of small micro- or even nano-particles, for instance of volume mean diameter less than 5 µm, preferably less than 2 µm, more preferably less than 1 µm. Such particulate products preferably have narrow size distributions, such as with a standard deviation of 2.5 or less, more preferably 2.0 or less, most preferably 1.9 or even 1.8 or less.

The use of near-sonic, sonic or supersonic anti-solvent velocities also appears to lead to more efficient vehicle extraction, thus potentially yielding particles with lower residual solvent levels, less agglomeration and generally improved handling properties.

The anti-solvent fluid must be in a compressed state, by which is meant that it is above its vapour pressure, preferably above atmospheric pressure, more preferably from 70 to 200 bar or from 80 to 150 bar. More preferably "compressed" means above the critical pressure $P_c$ for the fluid or fluid mixture concerned. In practice, the pressure of the anti-solvent fluid is likely to be in the range $(1.01–9.0)P_c$, preferably $(1.01–7.0)P_c$.

Thus, the anti-solvent is preferably a supercritical or near-critical fluid, although it may alternatively be a compressed liquid such as for instance liquid $CO_2$.

As used herein, the term "supercritical fluid" means a fluid at or above its critical pressure ($P_c$) and critical temperature ($T_c$) simultaneously. In practice, the pressure of the fluid is likely to be in the range $(1.01–9.0)P_c$, preferably $(1.01–7.0)P_c$, and its temperature in the range $(1.01–4.0)T_c$ (measured in Kelvin). However, some fluids (e.g., helium and neon) have particularly low critical pressures and temperatures, and may need to be used under operating conditions well in excess of (such as up to 200 times) those critical values.

"Near-critical fluid" is here used to refer to a fluid which is either (a) above its $T_c$ but slightly below its $P_c$, (b) above its $P_c$ but slightly below its $T_c$ or (c) slightly below both its $T_c$ and its $P_c$. The term "near-critical fluid" thus encompasses both high pressure liquids, which are fluids at or above their critical pressure but below (although preferably close to) their critical temperature, and dense vapours, which are fluids at or above their critical temperature but below (although preferably close to) their critical pressure.

By way of example, a high pressure liquid might have a pressure between about 1.01 and 9 times its $P_c$, and a temperature between about 0.5 and 0.99 times its $T_c$. A dense vapour might, correspondingly, have a pressure between about 0.5 and 0.99 times its $P_c$, and a temperature between about 1.01 and 4 times its $T_c$.

The terms "supercritical fluid" and "near-critical fluid" each encompass a mixture of fluid types, so long as the mixture is in the supercritical or near-critical state respectively.

In the method of the present invention, it may be preferred that the operating temperature (i.e., the temperature in the particle formation vessel) be close to the critical temperature $T_c$ of the mixture of anti-solvent and target solution/suspension formed at the point of fluid contact. For example, the temperature might be between 0.9 and 1.1 times $T_c$ (in Kelvin), preferably between 0.95 and 1.05 times $T_c$, more preferably between 0.97 and 1.03 or between 0.98 and 1.02 times $T_c$, or perhaps between 1 and 1.05 or 1 and 1.03 or 1 and 1.02 times $T_c$. This is because at $T_c$ the velocity of sound in a fluid is theoretically zero; near-sonic, sonic and supersonic velocities can thus more readily be achieved, using lower anti-solvent flow rates, as $T_c$ is approached.

The anti-solvent should be a compressed (preferably supercritical or near-critical, more preferably supercritical) fluid at its point of entry into the particle formation vessel and preferably also within the vessel and throughout the particle formation process. Thus, for a carbon dioxide anti-solvent the temperature in the particle formation vessel is ideally greater than 31° C., for example between 31 and 100° C., preferably between 31 and 70° C., and the pressure greater than 74 bar, for example between 75 and 350 bar. Carbon dioxide is a highly suitable anti-solvent, but others include nitrogen, nitrous oxide, sulphur hexafluoride, xenon, ethylene, chlorotrifluoromethane, ethane, trifluoromethane and noble gases such as helium or neon.

The anti-solvent must be miscible or substantially miscible with the fluid vehicle at the point of their contact, so that the anti-solvent can extract the vehicle from the target solution/suspension. By "miscible" is meant that the two fluids are miscible in all proportions, and "substantially miscible" encompasses the situation where the fluids can mix sufficiently well, under the operating conditions used, as to achieve the same or a similar effect, i.e., dissolution of the fluids in one another and precipitation of the target substance. However the anti-solvent must not, at the point of particle formation, extract or dissolve the target substance. In other words, it must be chosen so that the target substance is for all practical purposes (in particular, under the chosen operating conditions and taking into account any fluid modifiers present) insoluble or substantially insoluble in it. Preferably the target substance is less than $10^{-3}$ mole %, more preferably less than $10^{-5}$ mole %, soluble in the anti-solvent fluid.

The anti-solvent fluid may optionally contain one or more modifiers, for example water, methanol, ethanol, isopropanol or acetone. A modifier (or co-solvent) may be described as a chemical which, when added to a fluid such as a supercritical or near-critical fluid, changes the intrinsic properties of that fluid in or around its critical point, in particular its ability to dissolve other materials. When used, a modifier preferably constitutes not more than 40 mole %, more preferably not more than 20 mole %, and most preferably between 1 and 10 mole %, of the anti-solvent fluid.

The vehicle is a fluid which is able to carry the target substance in solution or suspension. It may be composed of one or more component fluids, e.g., it may be a mixture of two or more solvents. It must be soluble (or substantially soluble) in the chosen anti-solvent fluid at their point of contact. It may contain, in solution or suspension, other materials apart from the target substance.

The target solution/suspension may in particular comprise two or more fluids which are mixed in situ at or immediately before their contact with the anti-solvent. Such systems are described, e.g., in WO-96/00610 and WO-01/03821. The two or more fluids may carry two or more target substances, to be combined in some way (for instance, co-precipitated as a matrix, or one precipitated as a coating around the other, or precipitated as the product of an in situ reaction between the substances) at the point of particle formation. Target substance(s) may also be carried in the anti-solvent fluid as well as in the target solution(s)/suspension(s).

The target substance may be any substance which needs to be produced in particulate form. Examples include pharmaceuticals; pharmaceutical excipients such as carriers; dyestuffs; cosmetics; foodstuffs; coatings; agrochemicals; products of use in the ceramics, explosives or photographic industries; etc. . . . It may be organic or inorganic, monomeric or polymeric. It is preferably soluble or substantially soluble in the fluid vehicle, preferably having a solubility in it of $10^{-4}$ mole % or greater under the conditions under which the target solution is prepared (i.e., upstream of the point of particle formation).

In a preferred embodiment of the invention, the target substance is for use in or as a pharmaceutical or pharmaceutical excipient.

The target substance may be in a single or multi-component form (e.g., it could comprise an intimate mixture of two materials, or one material in a matrix of another, or one material coated onto a substrate of another, or other similar mixtures). The particulate product, formed from the target substance using the method of the invention, may also be in such a multi-component form—examples include two pharmaceuticals intended for co-administration, or a pharmaceutical together with a polymer carrier matrix. Such products may be made (as described above) from solutions/suspensions containing only single component starting materials, provided the solutions/suspensions are contacted with the anti-solvent fluid in the correct manner. The particulate product may comprise a substance formed from an in situ reaction (i.e., immediately prior to, or on, contact with the anti-solvent) between two or more reactant substances each carried by an appropriate vehicle.

In the method of the invention, the anti-solvent and the target solution/suspension are introduced separately into the particle formation vessel (which is preferably the vessel in which the formed particles are collected) and contact each other after (preferably immediately after) their point of entry into the vessel. In this way, particle formation can be made to occur at a point where there is a high degree of control over conditions such as the temperatures, pressures and flow rates of the fluids.

The fluids are ideally introduced in such a way that the mechanical (kinetic) energy of the anti-solvent fluid can act to disperse the target solution/suspension at the same time as it extracts the vehicle; this again allows a high degree of control over the physicochemical characteristics of the particulate product, in particular the size and size distribution of the particles and their solid state properties. "Disperse" in this context refers generally to the transfer of kinetic energy from one fluid to another, usually implying the formation of droplets, or of other analogous fluid elements, of the fluid to which the kinetic energy is transferred. Thus, the fluid inlet means used to introduce the fluids should allow the mechanical energy (typically the shearing action) of the anti-solvent flow to facilitate intimate mixing of the fluids and to disperse them, at the point where the fluids meet.

Introducing the two fluids separately in this way can help prevent apparatus blockages at the point of anti-solvent entry, due for example to the highly efficient extraction of the vehicle into the anti-solvent under the operating conditions used.

Thus, the present invention may be seen as a modification of the SEDS™ process, in which the target solution/suspension and the anti-solvent fluid contact one another externally of their respective (preferably separate) fluid inlets into the particle formation vessel. A high degree of control is retained over the mechanism for fluid contact, as in the basic SEDS™ process, and this control may be achieved for example at least partly by introducing the anti-solvent fluid with a sonic, near-sonic or supersonic velocity. Other ways in which such control may be achieved or improved upon include providing controlled agitation within the particle formation vessel, in particular in the region of fluid contact immediately downstream of the respective target solution/suspension and anti-solvent inlets. For example, the target solution/suspension may be dispersed onto a sonicating surface at or immediately prior to its contact with the anti-solvent fluid. Agitation may alternatively be achieved for instance by stirring, such as with a turbine, propeller, paddle, impeller or the like.

That said, the present invention may if necessary be practised in the absence of such additional agitation means within the particle formation vessel.

The target solution/suspension may be introduced into the vessel through any suitable fluid inlet means, including one which effects, or assists in effecting, controlled atomisation of the solution/suspension.

Preferably the two fluids meet immediately downstream of the point of anti-solvent entry. "Immediately" in this context implies a sufficiently small time interval (between the anti-solvent entering the particle formation vessel and its contact with the target solution/suspension) as preferably still to allow transfer of mechanical energy from the anti-solvent to the solution/suspension so as to achieve dispersion. Nevertheless, there is still preferably a short interval of time between anti-solvent entry and fluid contact so as to eliminate, or substantially eliminate or at least reduce, the risk of apparatus blockage due to particle formation at the point of anti-solvent entry. The timing of the fluid contact will depend on the natures of the fluids, the target substance and the desired end product, as well as on the size and geometry of the particle formation vessel and the apparatus used to introduce the fluids and on the fluid flow rates. The contact may occur within 0.5 to 10 seconds, more preferably within 1 to 7 seconds, most preferably within 1.2 to 6 seconds, such as within 1.4 to 5.5 seconds, of the anti-solvent entering the particle formation vessel.

The target solution/suspension is preferably introduced directly into the anti-solvent flow. It preferably meets with the anti-solvent flow at the point where the target solution/suspension enters the vessel.

Preferably the outlet of the first fluid inlet means is located vertically below that of the second fluid inlet means, and the anti-solvent fluid flows into the particle formation vessel in a vertically downwards direction.

At the point where the target solution/suspension and the anti-solvent meet, the angle between their axes of flow may be from 0° (i.e., the two fluids are flowing in parallel directions) to 180° (i.e., oppositely-directed flows). However, they preferably meet at a point where they are flowing in approximately perpendicular directions, i.e., the angle between their axes of flow is from 70 to 110°, more preferably from 80 to 100°, such as 90°.

Suitable fluid inlet means, which may be used to achieve the form of fluid contact required by the first aspect of the invention, is described below in connection with the second aspect.

Use of such a fluid inlet system can allow SEDS™ and other GAS-based particle formation techniques to be practised in cases where the vehicle for the target solution/suspension is a relatively high boiling fluid (e.g., boiling point greater than about 150° C., or even greater than 180° C.) such as dimethyl formamide (DMF), dimethyl sulphoxide (DMSO), dimethyl acetamide (DMA), diethyl acetamide (DEA) or N-methyl pyrollidinone (NMP), or where the target substance is temperature sensitive. Since the anti-solvent and the target solution/suspension enter the vessel separately, the latter can be maintained at a desired lower temperature despite the use of a relatively high temperature for the incoming anti-solvent. Moreover, the use of a sonic, near-sonic or supersonic anti-solvent velocity can be sufficient to disperse the target solution/suspension at relatively low operating temperatures (i.e., vessel temperatures)—again this assists in the processing of temperature sensitive target substances and vehicles.

When carrying out the present invention, the particle formation vessel temperature and pressure are ideally controlled so as to allow particle formation to occur at or substantially at the point where the target solution/suspension meets the anti-solvent fluid. The conditions in the vessel must generally be such that the anti-solvent fluid, and the solution which is formed when it extracts the vehicle, both remain in the compressed (preferably supercritical or near-critical, more preferably supercritical) form whilst in the vessel. For the supercritical, near-critical or compressed solution, this means that at least one of its constituent fluids (usually the anti-solvent fluid, which in general will be the major constituent of the mixture) should be in a compressed state at the time of particle formation. There should at that time be a single-phase mixture of the vehicle and the anti-solvent fluid, otherwise the particulate product might be distributed between two or more fluid phases, in some of which it might be able to redissolve. This is why the anti-solvent fluid needs to be miscible or substantially miscible with the vehicle.

The terms "supercritical solution", "near-critical solution" and "compressed solution" mean respectively a supercritical, near-critical or compressed fluid together with a fluid vehicle which it has extracted and dissolved. The solution should itself still be in the supercritical, near-critical or compressed state, as the case may be, and exist as a single phase, at least within the particle formation vessel.

Selection of appropriate operating conditions will be influenced by the natures of the fluids involved (in particular, their $P_c$ and $T_c$ values and their solubility and miscibility characteristics) and also by the characteristics desired of the particulate end product, for instance yield, particle size and size distribution, purity, morphology, or crystalline, polymorphic or isomeric form. Variables include the flow rates of the anti-solvent fluid and the target solution/suspension, the concentration of the target substance in the vehicle, the temperature and pressure inside the particle formation vessel, the anti-solvent temperature upstream of the vessel and the geometry of the fluid inlets into the vessel, in particular the size of the anti-solvent inlet. The method of the invention preferably involves controlling one or more of these variables so as to influence the physicochemical characteristics of the particles formed.

The flow rate of the anti-solvent fluid relative to that of the target solution/suspension, and its pressure and temperature, should be sufficient to allow it to accommodate the vehicle, so that it can extract the vehicle and hence cause particle formation. The anti-solvent flow rate will generally be higher than that of the target solution/suspension—typically, the ratio of the target solution/suspension flow rate to the anti-solvent flow rate (both measured at or immediately prior to the two fluids coming into contact with one another) will be 0.001 or greater, preferably from 0.01 to 0.2, more preferably from about 0.03 to 0.1.

The anti-solvent flow rate will also generally be chosen to ensure an excess of the anti-solvent over the vehicle when the fluids come into contact, to minimise the risk of the vehicle re-dissolving and/or agglomerating the particles formed. At the point of extraction of the vehicle it may constitute from 1 to 80 mole %, preferably 50 mole % or less or 30 mole % or less, more preferably from 1 to 20 mole % and most preferably from 1 to 5 mole %, of the compressed fluid mixture formed.

Both the anti-solvent and the target solution/suspension are ideally introduced into the particle formation vessel with a smooth, continuous and preferably pulse-less or substantially pulse-less flow. Conventional apparatus may be used to ensure such fluid flows.

The method of the invention preferably additionally involves collecting the particles following their formation, more preferably in the particle formation vessel itself.

According to a second aspect of the present invention, there is provided apparatus for use in preparing a target substance in particulate form, and in particular for use in a method according to the first aspect of the invention, the apparatus comprising:

(i) a particle formation vessel;
(ii) first fluid inlet means for introducing into the vessel a solution or suspension of the target substance in a fluid vehicle (the "target solution/suspension"); and
(iii) second fluid inlet means, separate from the first, for introducing a compressed fluid anti-solvent into the particle formation vessel;

wherein the first and second fluid inlet means are so arranged that, in use, a target solution/suspension introduced through the first and an anti-solvent introduced through the second enter the particle formation vessel at different locations and meet immediately downstream (in the direction of anti-solvent flow) of the second fluid inlet means.

The first fluid inlet means suitably comprises a fluid inlet tube, for instance of stainless steel, which might typically have an internal diameter of from 0.1 to 0.2 mm, more preferably from 0.1 to 0.15 mm, and may have a tapered outlet section.

The second fluid inlet means preferably provides a restriction at the point of fluid entry into the particle formation vessel: for instance, the second fluid inlet means may comprise a nozzle. Again it may suitably be made from stainless steel. It preferably has at least one passage of internal diameter from for instance 1 to 2 mm, more preferably from 1.3 to 1.9 mm, such as 1.6 mm. Again, it may have a tapered outlet section (i.e., be a "convergent"-type nozzle), with an angle of taper (with respect to the longitudinal axis of the nozzle) typically in the range 10° to 60°, preferably from 10° to 50°, more preferably from 20° to 40°, and most preferably about 30°.

The opening at the outlet end (tip) of the nozzle will preferably have a diameter in the range of 0.005 to 5 mm, more preferably 0.05 to 2 mm, most preferably from 0.1 to 0.5 mm, for instance about 0.1, 0.2, 0.3 or 0.35 mm.

The dimensions of the fluid inlet will naturally depend on the scale on which the process is to be practised; for commercial scale manufacture, for example, the above nozzle dimensions may be up to ten times larger.

A nozzle of the above type may comprise more than one fluid passage; for instance it may comprise two or more coaxial passages such as in the nozzles described in WO-95/01221, WO-96/00610 and WO-98/36825, particularly if additional fluids are to be introduced into the system. One or more of the passages may be used to introduce two or more fluids at the same time, and the inlets to such passages may be modified accordingly.

The outlet of the first fluid inlet means (into the particle formation vessel) is preferably immediately downstream, in the direction of anti-solvent flow in use, of that of the second fluid inlet means. A suitable separation for the two outlets is a short distance such as from 0 to 50, preferably from 10 to 40, for instance about 20 times the diameter of the outlet of the second fluid inlet means. Suitable distances might lie from 0 to 10 mm or from 0.1 to 10 mm, preferably from 2 to 8 mm, for instance about 4 mm. Again, they may depend on the scale of the process which the inlet means are to be used for.

The outlet of the first fluid inlet means preferably has a smaller cross sectional area than that of the second fluid inlet means, more preferably less than 80% as large and most preferably less than 70% or 65% as large. Preferably this outlet is positioned such that, in use, it is within the flow of anti-solvent fluid exiting the second fluid inlet means. Most preferred is an arrangement in which the centre of the outlet of the first fluid inlet means corresponds to the centre of the outlet of the second fluid inlet means, i.e., the centres of the two outlets are both positioned on the central longitudinal axis of the second fluid inlet means.

The first and second fluid inlet means are preferably arranged so that at the point where the target solution/suspension and the anti-solvent meet, the angle between their axes of flow is from 70° to 110°, more preferably from 80 to 100°, most preferably about 90°.

The first and second fluid inlet means may for convenience be provided as part of a single fluid inlet assembly which may be placed in fluid communication with the particle formation vessel and with sources of the anti-solvent fluid and the target solution/suspension.

Thus, according to a third aspect, the present invention provides a fluid inlet assembly for use as part of apparatus according to the second aspect of the invention, and/or in a method according to the first aspect.

In apparatus according to the second aspect of the invention, the particle formation vessel preferably contains particle collection means, such as a filter, by which particles of the target substance may be collected in the vessel in which they form, downstream of the point of contact between the target solution/suspension and the anti-solvent fluid.

The apparatus may additionally comprise a source of a compressed (preferably supercritical or near-critical) fluid and/or a source of a target solution or suspension. The former may itself comprise means for altering the temperature and/or pressure of a fluid so as to bring it into a compressed (preferably supercritical or near-critical) state. The apparatus conveniently includes means for controlling the pressure in the particle formation vessel, for example a back pressure regulator downstream of the vessel, and/or means (such as an oven) for controlling the temperature in the vessel. The vessel is conveniently a pressure vessel and should be capable of withstanding the pressures necessary to maintain compressed (preferably supercritical or near-critical) conditions during the particle formation process, as described above in connection with the method of the invention.

Because embodiments of the present invention are modified versions of the inventions disclosed in WO-95/01221, WO-96/00610, WO-98/36825, WO-99/44733, WO-99/59710, WO-01/03821, WO-01/15664 and WO-02/38127, technical features described in those documents, for instance regarding the selection of appropriate reagents and operating conditions, can apply also to the present invention. The eight earlier documents are therefore intended to be read together with the present application.

In this specification the term "substantially", when applied to a condition, is meant to encompass the exact condition (e.g., exact simultaneity) as well as conditions which are (for practical purposes, taking into account the degree of precision with which such conditions can be measured and achieved) close to that exact condition, and/or which are similar enough to that exact condition as to achieve, in context, the same or a very similar effect.

References to solubilities and miscibilities, unless otherwise stated, are to the relevant fluid characteristics under the operating conditions used, i.e., under the chosen conditions of temperature and pressure and taking into account any modifiers present in the fluids.

The present invention will now be illustrated with reference to the following non-limiting examples and the accompanying figures, of which:

FIGS. 11A and 11B show particle size distributions for the product of Example B2;

FIGS. 12A and 12B show particle size distributions for the product of Example B3;

FIGS. 15A and 15B show particle size distributions for the product of Example D1;

FIGS. 16A and 16B show particle size distributions for the product of Example D2.

DETAILED DESCRIPTION

Figure 1:
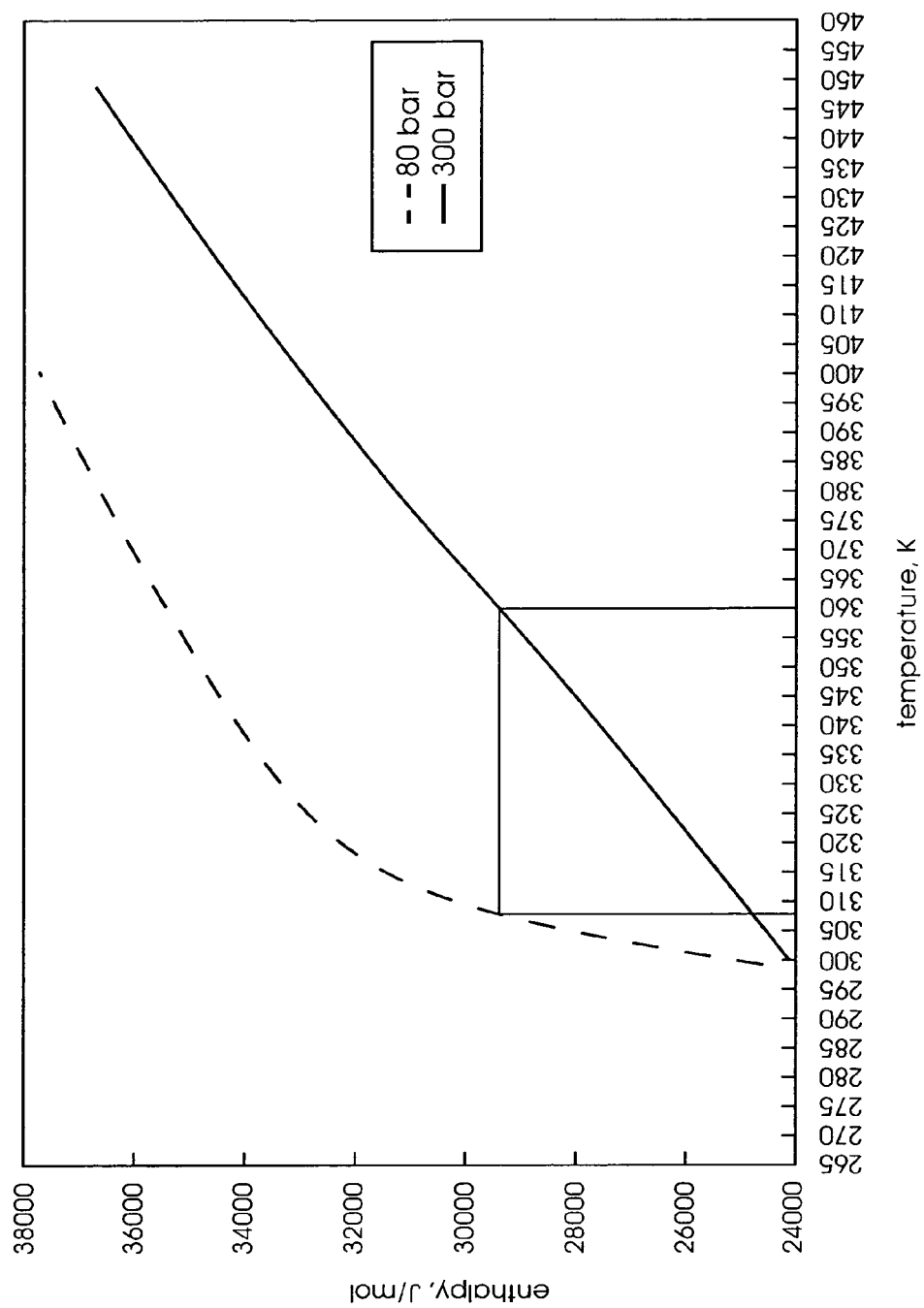
FIG. 1 is a plot of the enthalpy variation of $CO_2$ with temperature and pressure, illustrating the change in $CO_2$ temperature during its isenthalpic expansion.
Figure 2:
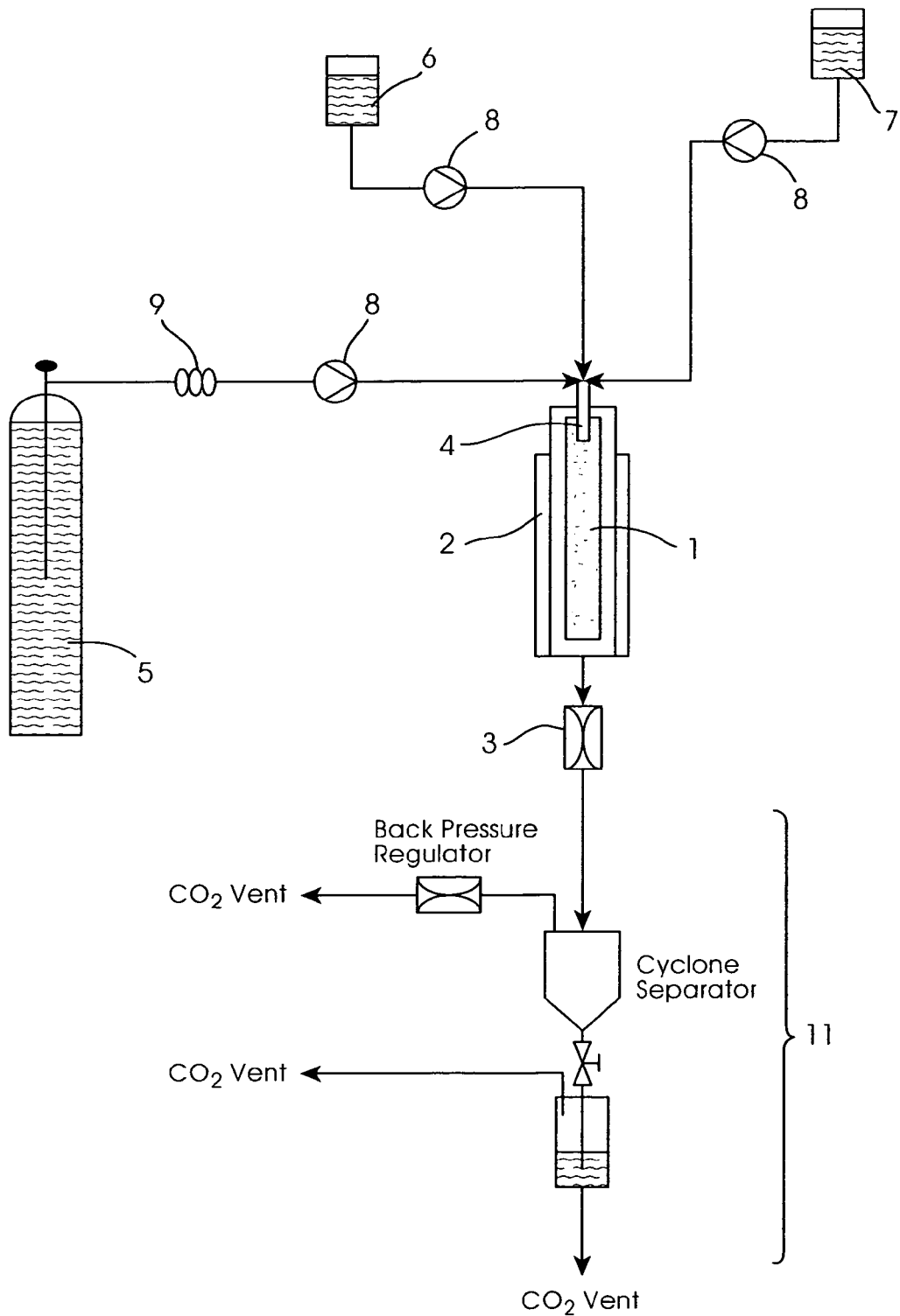
FIG. 2 illustrates schematically apparatus suitable for use in carrying out a method according to the present invention.

FIG. 2 shows apparatus suitable for carrying out methods in accordance with the present invention. Item 1 is a particle formation vessel, within which the temperature and pressure can be controlled by means of the heating jacket 2 and back pressure regulator 3. The vessel 1 contains a particle collection device (not shown) such as a filter, filter basket or filter bag. A fluid inlet assembly 4 allows introduction of a compressed (typically supercritical or near-critical) fluid anti-solvent from source 5 and one or more target solutions/suspensions from sources such as 6 and 7. The items labelled 8 are pumps, and 9 is a cooler. A recycling system 11 allows solvent recovery.

Figure 3:
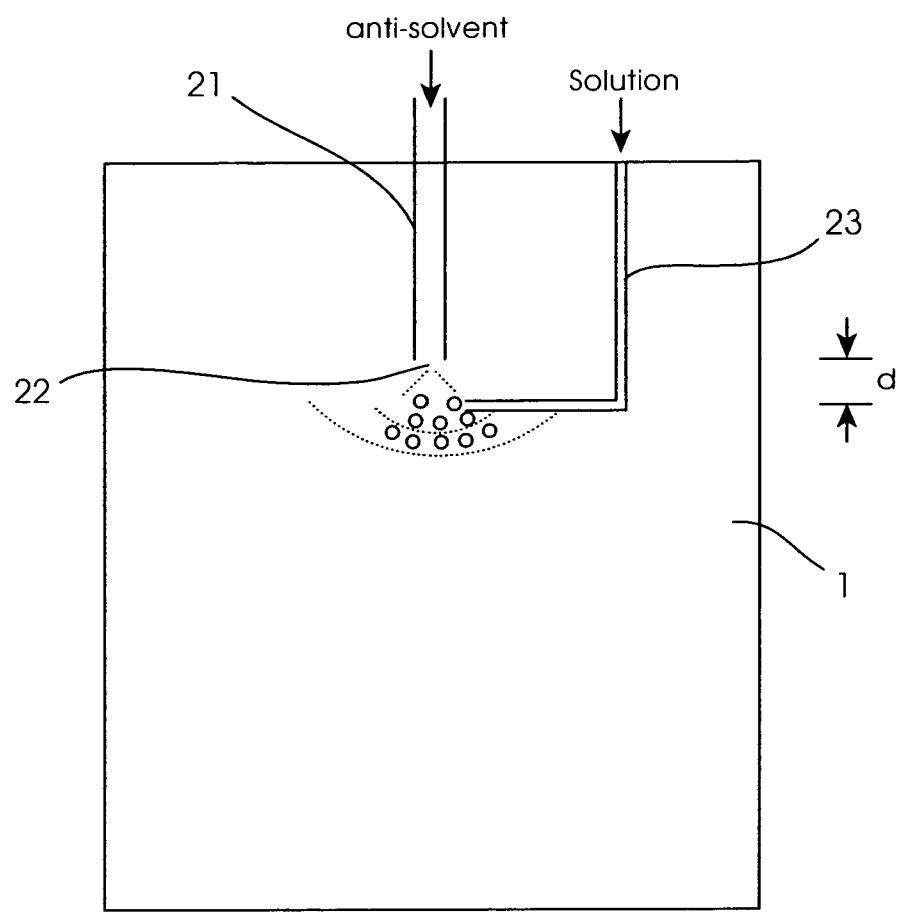
FIGS. 3 to 5 are schematic longitudinal cross sections and an under plan view respectively of parts of a fluid inlet assembly useable with the FIG. 2 apparatus.
Figure 4:
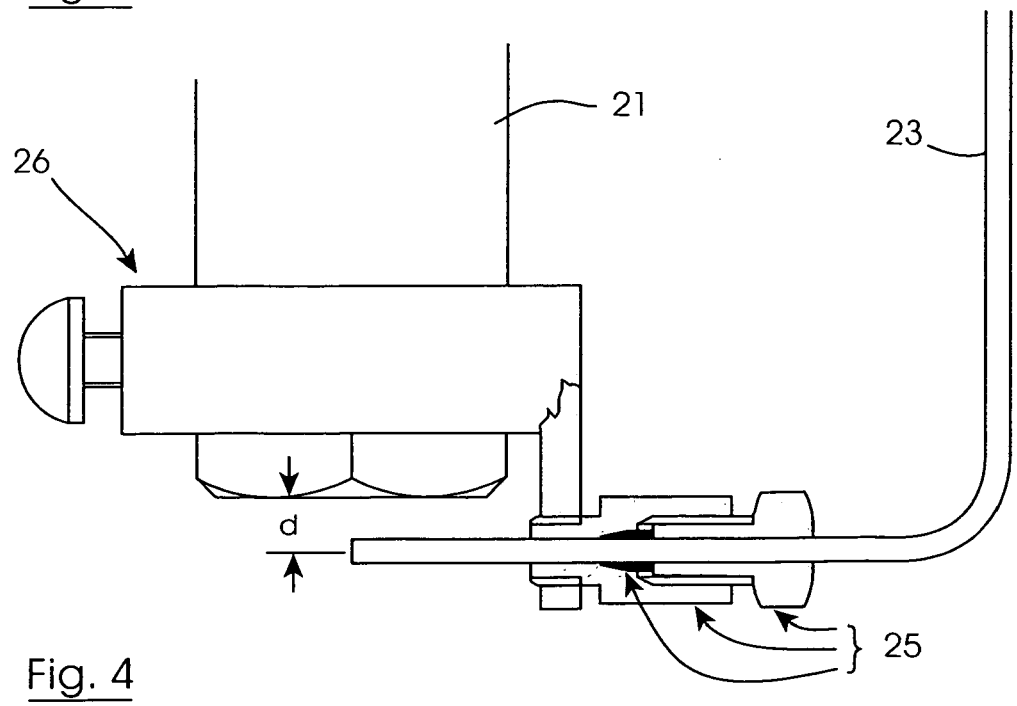
Figure 5:
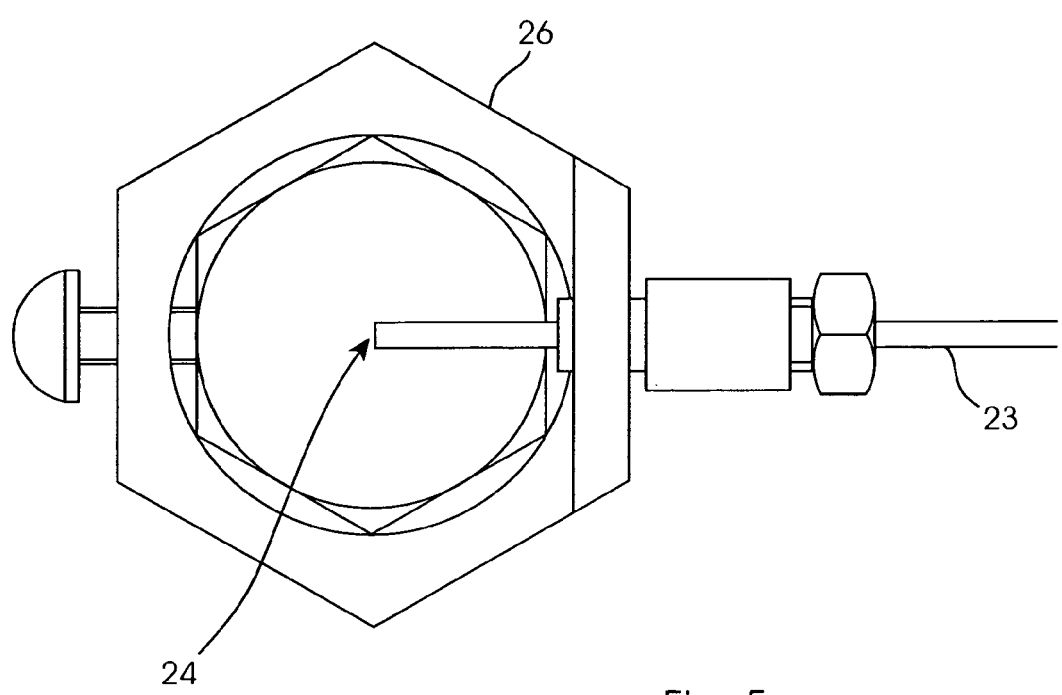
Figure 6:
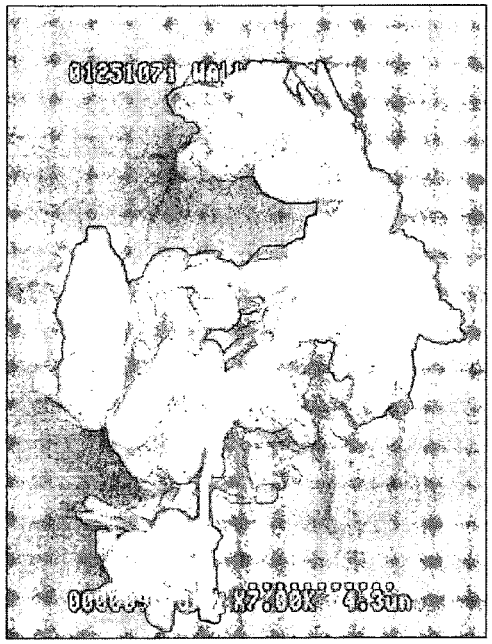
FIGS. 6 to 9 are SEM (scanning electron microscope) photographs of the products of Examples A1, A2, A5 and A6 (below) respectively.
Figure 7:
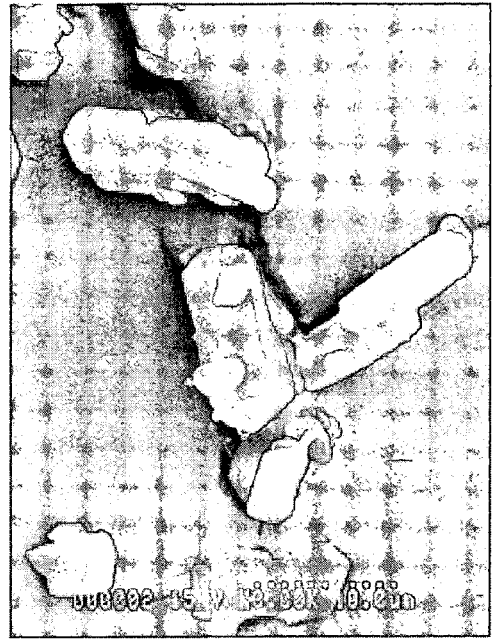
Figure 8:
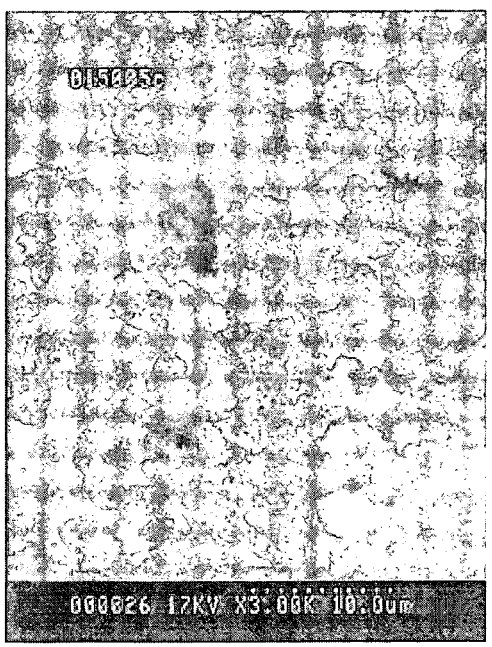
Figure 9:
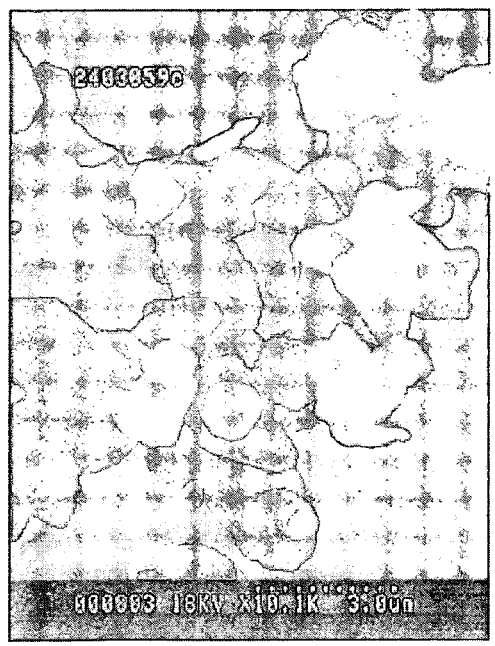
Figure 10A:
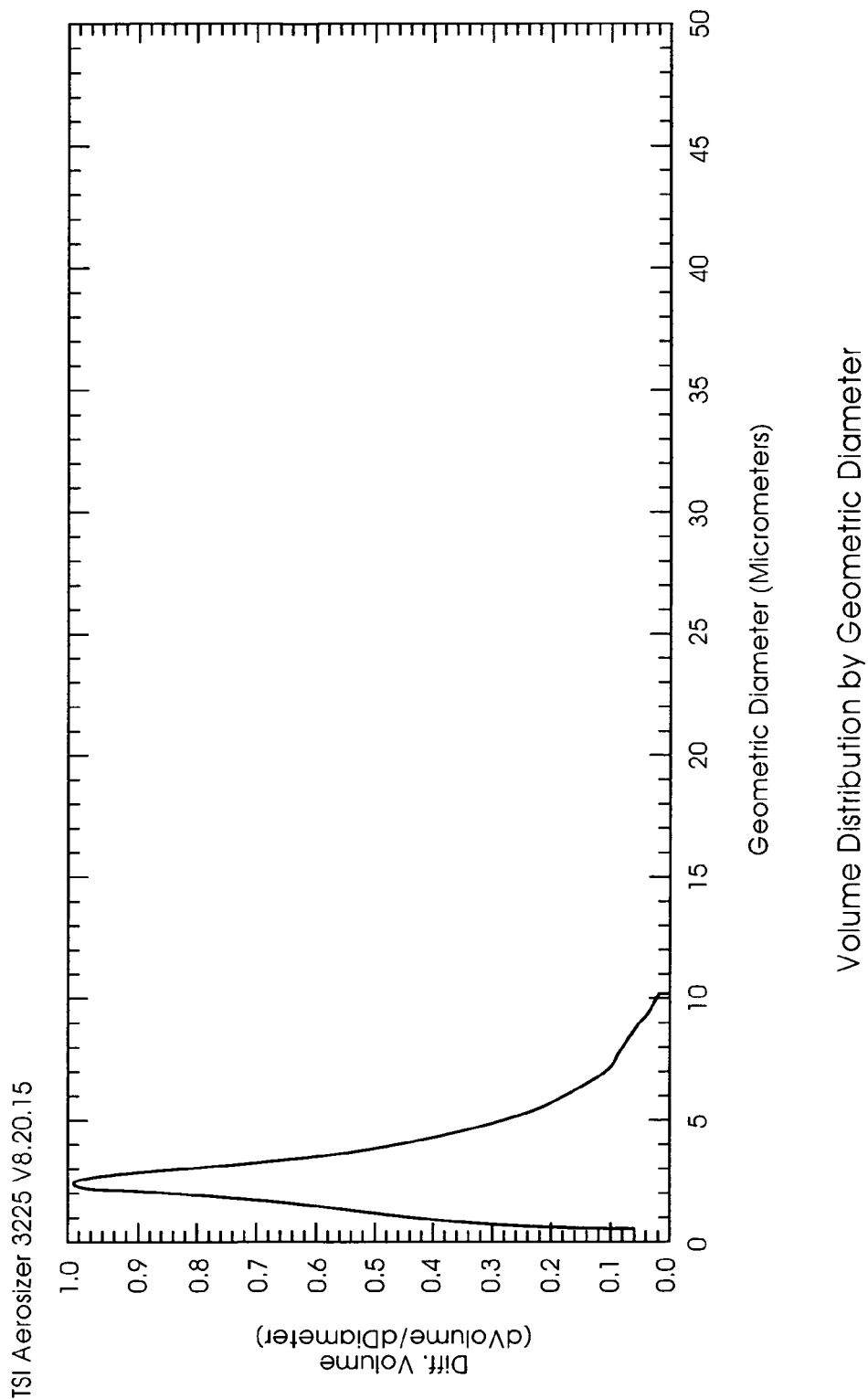
FIGS. 10 and 10B show particle size distributions for the product of Example B1.
Figure 11A:
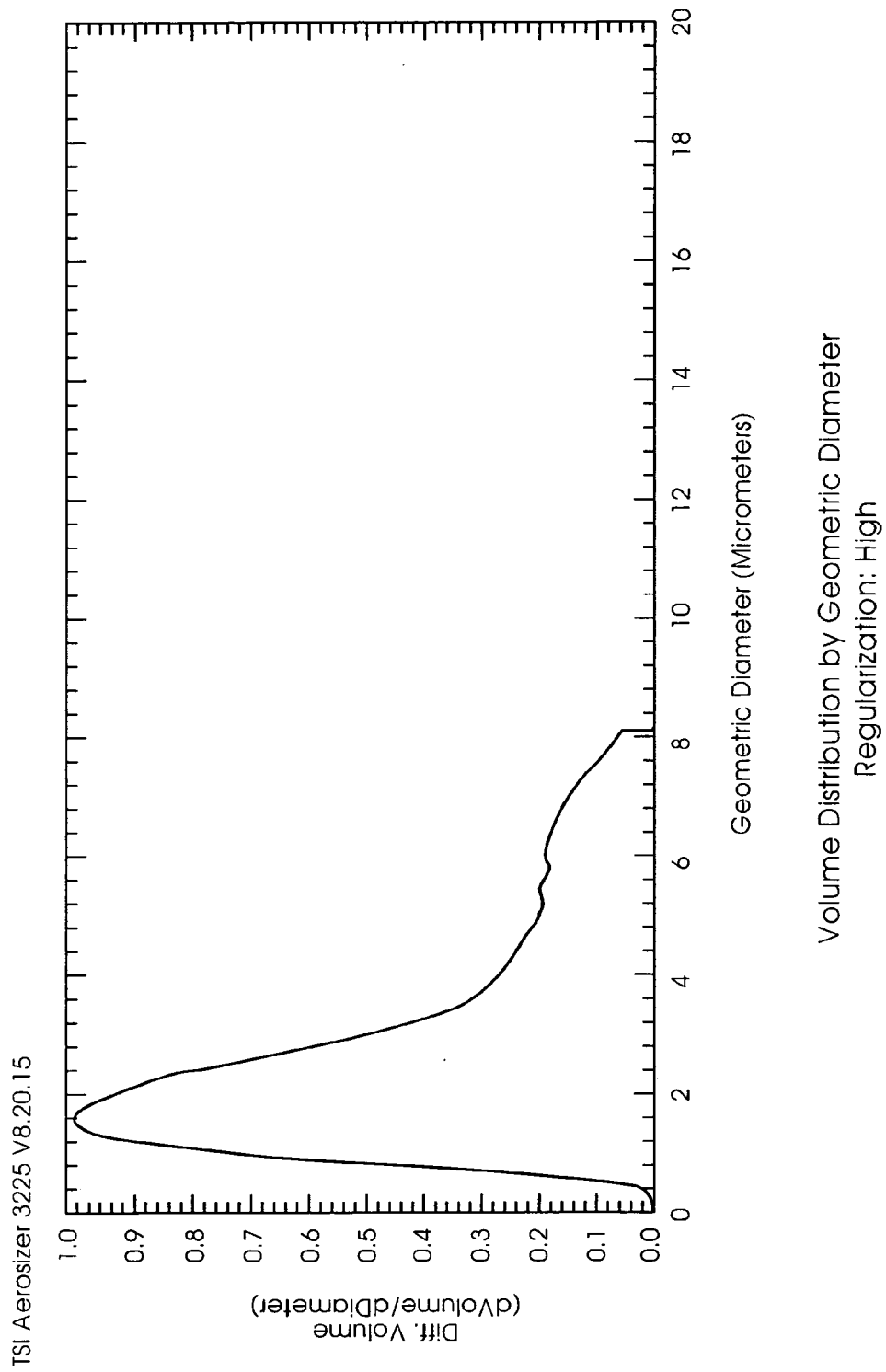
Figure 12A:
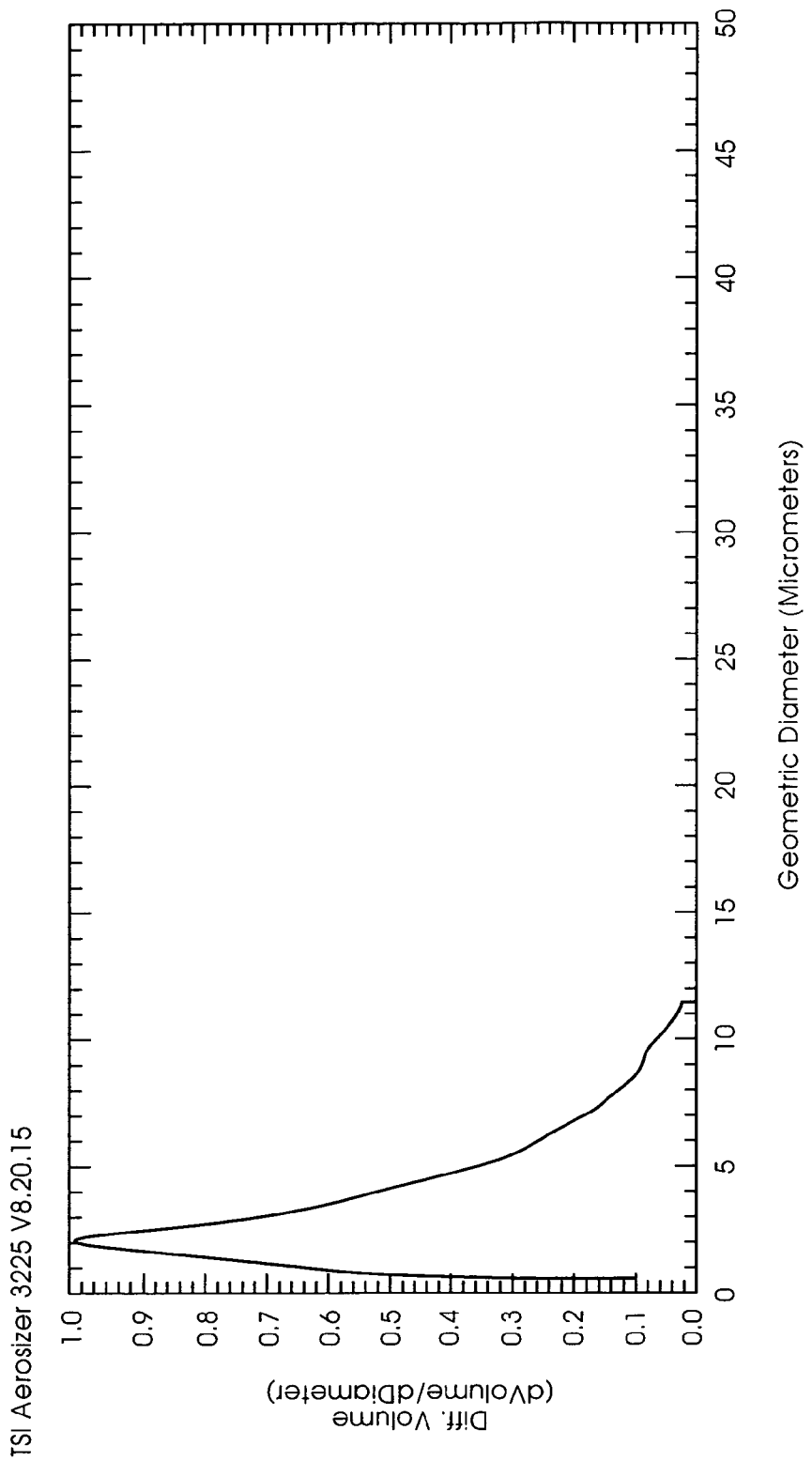

The fluid inlet assembly 4 may for example take the form shown in FIGS. 3 to 5. FIG. 3 shows the assembly schematically, in use with the particle formation vessel 1 of the FIG. 2 apparatus. Nozzle 21 is for introduction of the anti-solvent fluid. It has only a single passage of circular cross section, with a circular outlet 22. Alternatively, a multi-component nozzle may be used, with anti-solvent introduced through one or more of its passages and the remaining passages either closed off or else used to introduce additional reagents. (For example, a multi-passage nozzle of the type described in WO-95/01221 or WO-96/00610 may be used. Such nozzles have two or more concentric (coaxial) passages, the outlets of which are typically separated by a short distance to allow a small degree of internal mixing to take place between fluids introduced through the respective passages before they exit the nozzle. The anti-solvent could for instance be introduced through the inner passage of such a nozzle, traversing a small "mixing" zone as it exits that inner passage and then passing through the main nozzle outlet into the particle formation vessel.)

Inlet tube 23 is for introduction of the target solution/suspension, and is so shaped and located that the direction of flow of the solution/suspension at its outlet 24 (see FIG. 5) will be perpendicular to that of the anti-solvent exiting nozzle 21. Again the tube is of circular cross section.

FIG. 4 shows how tube 23 is mounted, by means of the supporting and locking pieces 25, on a collar 26 which is itself mounted around the lower portion of the nozzle 21. The arrangement is such as to allow adjustment of the distance "d" between the outlets of nozzle 21 and tube 23.

It can be seen that the outlet of tube 23 is positioned on the central longitudinal axis of the nozzle 21.

Both the nozzle 21 and the tube 23 are preferably made from stainless steel.

The assembly of FIGS. 3 to 5 may be less likely to suffer blockages (at the nozzle and tube outlets) than a multi-component SEDS™ nozzle of the type described in WO-95/01221, particularly when the operating conditions are such as to allow a very rapid and efficient removal of the solvent vehicle, from the target solution/suspension, by the anti-solvent.

EXAMPLES

Apparatus as shown in FIG. 2, incorporating a fluid inlet assembly as shown in FIGS. 3 to 5, was used to carry out particle formation methods in accordance with the invention. The nozzle 21 comprised a fluid inlet tube of internal diameter 1.6 mm and an outlet of diameter 0.2 mm. The internal bore at the end of the inlet tube 23 was 0.125 mm. The vertical separation "d" between the nozzle and tube outlets was varied between 0 and 8 mm, "0" representing the situation where the solution tube 23 contacted the lower end of the nozzle 21.

Supercritical carbon dioxide was used as the anti-solvent. It was pumped at a flow rate (of liquid $CO_2$, prior to passing through a heater) of 200 g/min. Its temperature on entry into the nozzle 21 was 356 K (83° C.).

The pressure in the particle formation vessel 1 (capacity 2 liters) was maintained at 80 bar and 309–313 K (36–40° C.). The $CO_2$ back pressure was between 250 and 300 bar. These conditions created a sonic or supersonic $CO_2$ velocity at the nozzle outlet 22.

Examples A

Various target compounds were dissolved in appropriate solvents and introduced into the apparatus via tube 23. The distance "d" between the outlets of the anti-solvent nozzle and the solution inlet tube was kept constant at 4 mm. Particle formation was allowed to occur by the action of the $CO_2$ anti-solvent, and the products collected in the vessel 1. The products were assessed by scanning electron microscopy (SEM) and in most cases their particle sizes analysed using an Aerosizer™ and/or Sympatec™ system.

The results of these experiments are shown in Table 1 below.

TABLE 1

| Expt no. | Target solution | Target solution concentration (% w/v) | Target solution flow rate (ml/min) | Product size (Aerosizer ™) (μm) | Product size (Sympatec ™) (μm) |
|---|---|---|---|---|---|
| A1 | Compound I in methanol | 3 | 4 | 2.84 | — |
| A2 | Compound II in methanol | 1.75 | 4 | — | 5.75 |
| A3 | Compound III in DMF | 3 | 0.5 | 1.39 | 7.99 |
| A4 | Compound IV in DMF | 0.85 | 4 | — | — |
| A5 | Compound V in DMSO | 3 | 1 | — | 4.6 |
| A6 | Compound VI in THF | 5 | 1 | 0.97 | 2.5 |

SEM photographs of the products of Experiments A1, A2, A5 and A6 are shown in FIGS. 6 to 9 respectively.

Examples B

In these experiments, the distance "d" between the outlets of the anti-solvent nozzle 21 and the solution inlet tube 23 was varied between 0 and 8 mm. In practice, the "0" separation represented the thickness of the inlet tube wall—in other words, as close to zero as was possible without cutting into the nozzle wall. The target solution was 3% w/v compound I in methanol; its flow rate into the particle formation vessel 1 was 4 ml/min.

The results are shown in Table 2 below.

TABLE 2

| Expt no. | Distance "d" (mm) | Product size (Aerosizer ™) (μm) |
|---|---|---|
| B1 | 0 | 3.21 |
| B2 | 4 | 2.84 |
| B3 | 8 | 3.63 |

The particle size distributions (by Aerosizer™) for the products of Examples B1, B2 and B3 are shown in FIGS. 10A and 10B, 11A and 11B, and 12A and 12B respectively.

Examples C

These experiments investigated the effect of the target solution flow rate on the product particle size. Again various target compounds were tested, the operating conditions being as for Examples A.

The results are given in Table 3 below.

TABLE 3

| Expt no. | Target solution | Target solution concentration (% w/v) | Target solution flow rate (ml/min) | Product size (Aerosizer ™) (μm) | Product size (Sympatec ™) (μm) |
|---|---|---|---|---|---|
| C1 | Compound II in acetone | 0.75 | 2 | — | 7.8 |
| C2 | Compound II in acetone | 0.75 | 4 | — | 4.75 |
| C3 | Compound IV in DMF | 0.85 | 1 | — | — |
| C4 | Compound IV in DMF | 0.85 | 4 | — | — |
| C5 | Compound IV in DMF | 0.85 | 8 | — | — |
| C6 | Compound III in DMF | 3 | 0.5 | 1.39 | 7.99 |
| C7 | Compound III in DMF | 3 | 1.0 | 1.86 | 7.18 |
| C8 | Compound III in DMF | 3 | 4 | 18.18 | 10.5 |
| C9 | Compound V in DMF(ac)* | 1.6 | 1 | — | 9.1 |
| C10 | Compound V in DMF(ac)* | 1.6 | 4 | — | 42.3 |
| C11 | Compound VI in THF | 5 | 1 | 0.97 | 2.5 |
| C12 | Compound VI in THF | 5 | 4 | 1.18 | 3.0 |

*DMF(ac) = DMF acidified with 4% v/v acetic acid

Examples D

These experiments compared two types of fluid inlet assembly. In Example D1, a two-fluid coaxial nozzle of the type described in WO-95/01221 was used to co-introduce supercritical $CO_2$ and Compound VI in solution in THF (tetrahydrofuran). The internal diameter of the inner nozzle passage, through which the $CO_2$ was introduced, was 1.6 mm; that of the outer passage, through which the target solution was introduced, 2.5 mm. The nozzle outlet diameter was 0.2 mm.

In Example D2, an assembly of the type illustrated in FIGS. 3 to 5, with a nozzle outlet separation "d" of 4 mm, was used to introduce the same reagents. The $CO_2$ was introduced through the inner passage of the nozzle used in Example D1; the outer nozzle passage was not used.

All other operating conditions were the same for both experiments. Within the particle formation vessel the temperature was 309 K (36° C.) and the pressure was 80 bar. The target solution concentration was 5% w/v and its flow rate 1 ml/min. The $CO_2$ flow rate was 200 g/min and its inlet temperature 356 K (83° C.).

The results are given in Table 4 below.

TABLE 4

| Expt no. | Product size (SEM) (μm) | Product size (Aerosizer ™) (μm) |
|---|---|---|
| D1 | 1–6 μm | 2.54 |
| D2 | 750 nm–4 μm | 1.5 |

Figure 13:
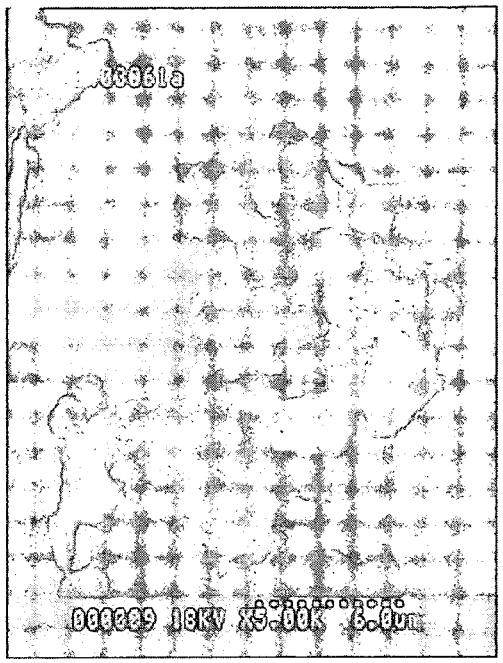
FIGS. 13 and 14 are SEM photographs of the products of Examples D1 and D2 respectively.
Figure 14:

SEMs for the products of Examples D1 and D2 are shown in FIGS. 13 and 14 respectively. Their Aerosizer™ particle size distributions are shown in FIGS. 15A and 15B and 16A and 16B respectively, D2 showing a significantly smaller particle size and a better distribution than D1.

It was also found that the fluid inlet assembly of FIGS. 3 to 5 (Example D2) gave a less agglomerated product.

Examples E

Two further target compounds, dihydroergotamine mesylate (Compound VII) and ipratropium bromide (Compound VIII) were prepared using a vessel temperature of 309 K (36° C.) and pressure of 80 bar, a $CO_2$ flow rate of 200 g/min and a nozzle separation "d" of 4 mm. The $CO_2$ temperature upstream of the vessel was 356 K (83° C.). Particle sizes were assessed using the Aerosizer™. The results are shown in Table 5 below.

TABLE 5

| Expt no. | Target solution | Target solution concentration (% w/v) | Target solution flow rate (ml/min) | $CO_2$ flow rate (ml/min) | Product size (Aerosizer ™) (μm) |
|---|---|---|---|---|---|
| E1 | Compound VII in methanol | 4.0 | 1.0 | 200 | 6.78 |
| E2 | Compound VII in methanol:water (9:1 v/v) | 2.0 | 1.0 | 210 | 0.87 |
| E3 | Compound VIII in methanol:water (95:5 v/v) | 1.0 | 2.0 | 210 | 3.79 |
| E4 | Compound VIII in methanol:water (95:5 v/v) | 1.0 | 4.0 | 210 | 5.62 |

Figure 17:
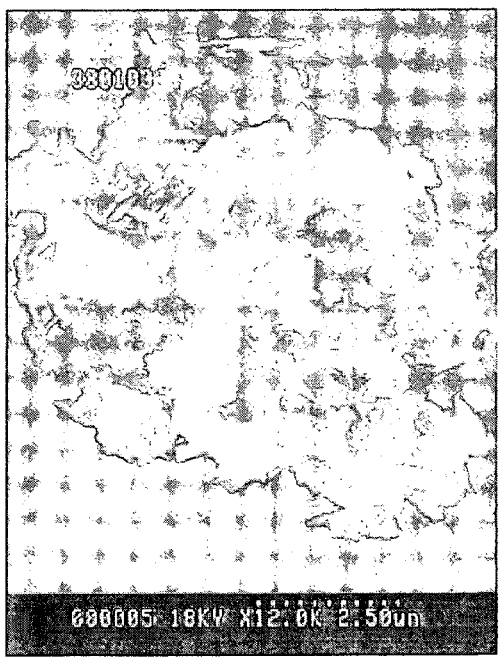
FIGS. 17 and 18 are SEM photographs of the products of Examples E2 and E3 respectively.
Figure 18:
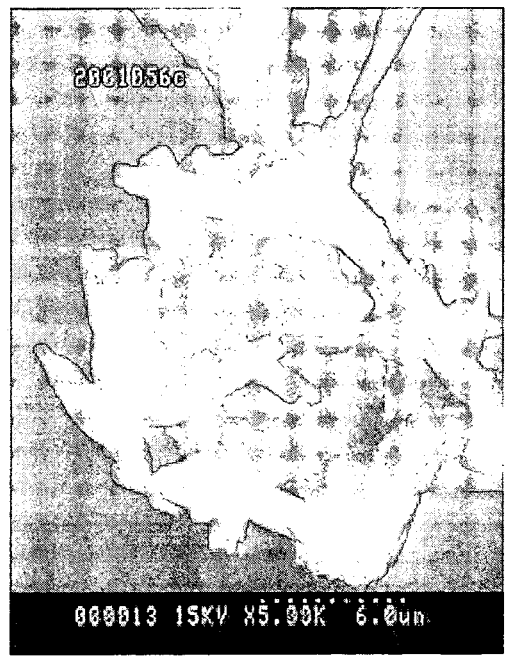
Figure 15A:
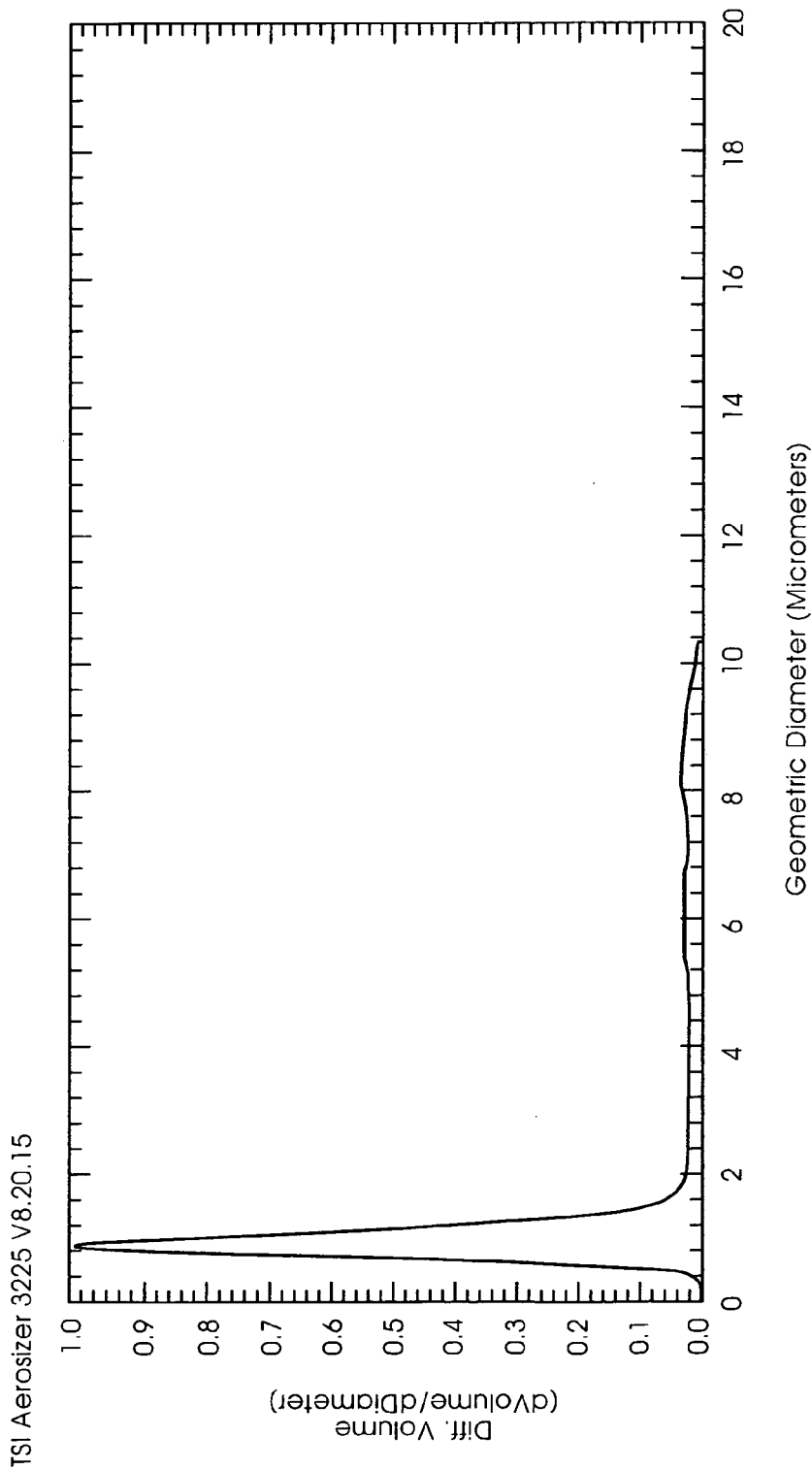
Figure 16A:
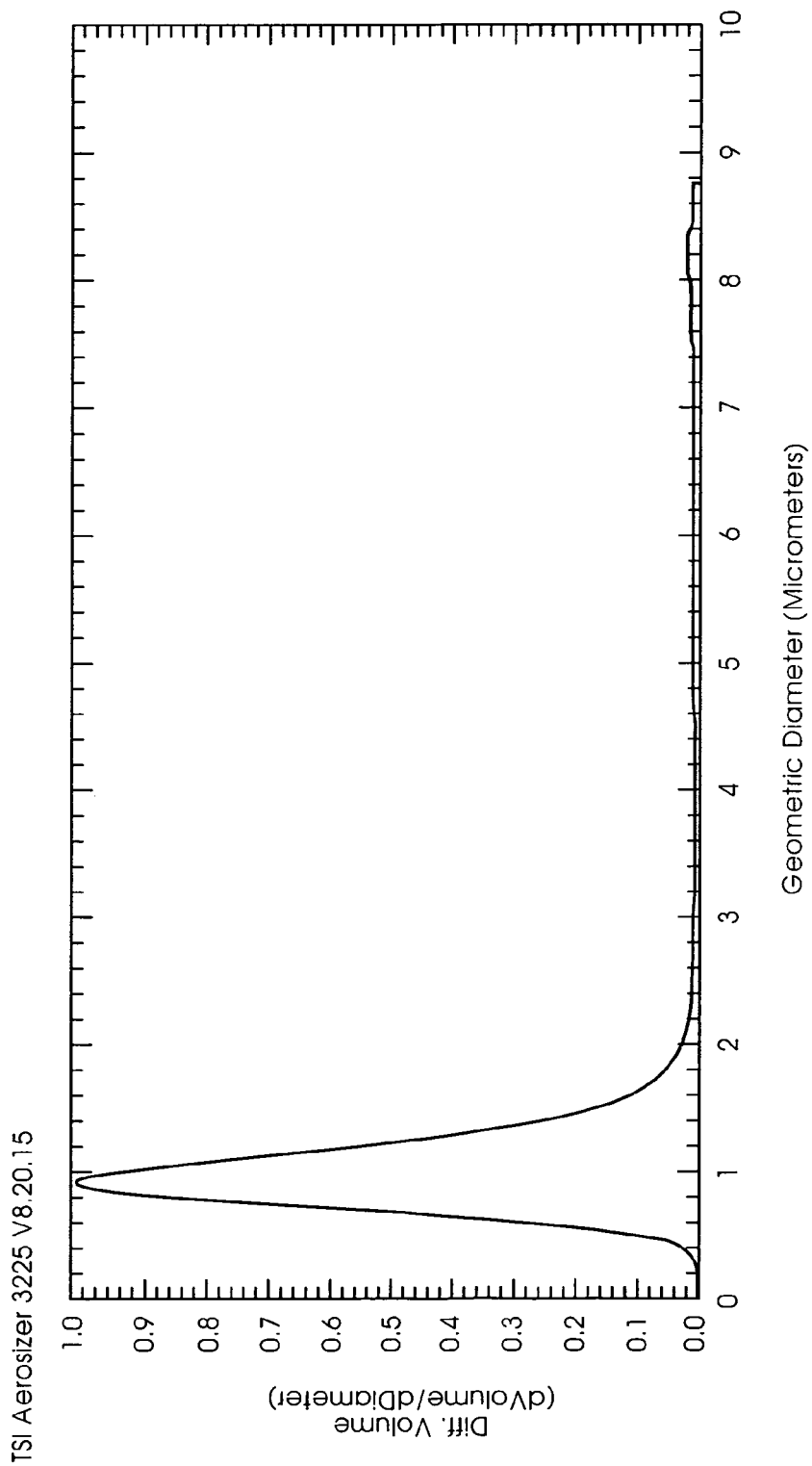

SEM photographs of the products of Experiments E2 and E3 are shown in FIGS. 17 and 18 respectively.

Examples F

Two drugs suitable for delivery by inhalation therapy were produced using the method of the invention. In all cases the products were fine, free-flowing powders having excellent dispersibility in fluids such as in particular the propellant fluids used to aerosolise such active substances in so-called "metered dose inhalers". The drugs exhibited improved flocculation performance in such propellants (in particular in HFA 134a and HFA 227ea), as compared to the performance of micronised versions of the same drugs having comparable particle sizes.

For these experiments, the $CO_2$ anti-solvent was pumped at different flow rates, as shown in Table 6 below. Its temperature on entry into the nozzle 21 of the FIG. 2 apparatus was 363 K (90° C.). The pressure in the particle formation vessel 1 (capacity 2000 ml) was maintained at 80 bar and 309 K (36° C.). The vertical separation "d" between the nozzle and solution tube outlets was 4 mm.

The reagents, solvents and other relevant operating conditions are summarised in Table 6, together with the particle sizes and size distributions of the products.

The particle sizes quoted in Table 6 are, where indicated (A), mass median aerodynamic diameters obtained using an Aerosizer™ time-of-flight instrument and, where indicated (S), geometric projection equivalent mass median diameters obtained using the Helos™ system available from Sympatec GmbH, Germany.

The particle size spread is defined as $(D_{90}-D_{10})/D_{50}$ and indicates how narrow the size distribution may be for products made according to the present invention.

The flocculation behaviour of the products of Examples F, in the propellants HFA 134a and HFA 227ea, are documented in our co-pending UK patent application no. 0208742.7.

The invention claimed is:

1. A method for preparing a substance in particulate form, the method comprising:
   introducing into a particle formation vessel, through separate first and second fluid inlets respectively, (a) a solution or suspension of the substance in a fluid and (b) a compressed fluid anti-solvent for the substance; and
   allowing the compressed fluid anti-solvent to extract the fluid from the solution or suspension to form particles of the substance;
   wherein the compressed fluid anti-solvent and the solution or suspension enter the particle formation vessel at different locations and meet downstream in the particle

TABLE 6

| Expt no. | Target substance | Vehicle | Target solution concn (% w/v) | Target solution flow rate (ml/min) | $CO_2$ flow rate (ml/min) | Product MMAD D(4,3) (μm) | Particle size spread |
|---|---|---|---|---|---|---|---|
| F1 | Salmeterol xinafoate | Methanol | 3 | 4 | 158 | 1.7 (A) | 1.8 (A) |
| F2 | Risperidone-(9-hydroxy)-palmitate | THF | 5 | 4 | 200 | 3.0 (S) | 1.52 (S) |
| F3 | Risperidone-(9-hydroxy)-palmitate | THF | 5 | 1 | 200 | 2.5 (S) | 1.52 (S) | formation vessel, the pressure in the particle formation vessel is $P_1$ and is greater than the critical pressure $P_c$ of the anti-solvent, the compressed fluid anti-solvent is introduced through a restricted inlet so as to have a back pressure of $P_2$, where $P_2$ is greater than $P_1$, the temperature in the particle formation vessel is $T_1$ and $T_1$ is greater than the critical temperature $T_c$ of the anti-solvent, the compressed fluid anti-solvent is introduced into the particle formation vessel at a temperature $T_2$, where $T_2$ is greater than $T_1$, $T_1$ and $T_2$ are such that Joule-Thomson cooling of the compressed fluid anti-solvent as it enters the particle formation vessel does not reduce temperature of the compressed anti-solvent to below that required of it to produce particles, $P_1$, $P_2$, $T_1$ and $T_2$ are such that the compressed fluid anti-solvent has a sonic, near-sonic or supersonic velocity as it enters the particle formation vessel, and $T_1$ and $T_2$ are such that the temperature of the compressed fluid anti-solvent does not fall below $T_c$ within the particle formation vessel.

2. A method for preparing a substance in particulate form, the method comprising:

introducing into a particle formation vessel, through separate first and second fluid inlets respectively, (a) a solution or suspension of the substance in a fluid and (b) a compressed fluid anti-solvent for the substance; and allowing the compressed fluid anti-solvent to extract the fluid from the solution or suspension to form particles of the substance;

wherein the compressed fluid anti-solvent has a sonic, near-sonic or supersonic velocity as it enters the particle formation vessel, the compressed fluid anti-solvent and the solution or suspension enter the particle formation vessel at different locations and meet downstream in the particle formation vessel, and a drop in pressure in the compressed fluid anti-solvent as the compressed fluid anti-solvent enters the particle formation vessel is between about 170 and about 250 bar.

3. A method for preparing a substance in particulate form, the method comprising:

introducing into a particle formation vessel, through separate first and second fluid inlets respectively, (a) a solution or suspension of the substance in a fluid and (b) a compressed fluid anti-solvent for the substance; and allowing the compressed fluid anti-solvent to extract the fluid from the solution or suspension to form particles of the substance;

wherein the compressed fluid anti-solvent has a sonic, near-sonic or supersonic velocity as it enters the particle formation vessel, the compressed fluid anti-solvent and the solution or suspension enter the particle formation vessel at different locations and meet downstream in the particle formation vessel, and a Mach disk is generated in the compressed fluid anti-solvent as it enters the particle formation vessel, the shock waves from which propagate in the direction of the compressed fluid anti-solvent flow.

4. A method for preparing a substance in particulate form, the method comprising:

introducing into a particle formation vessel, through separate first and second fluid inlets respectively, (a) a solution or suspension of the substance in a fluid and (b) a compressed fluid anti-solvent for the substance; and allowing the compressed fluid anti-solvent to extract the fluid from the solution or suspension to form particles of the substance;

wherein the compressed fluid anti-solvent has a sonic, near-sonic or supersonic velocity as it enters the particle formation vessel, the compressed fluid anti-solvent and the solution or suspension enter the particle formation vessel at different locations and meet downstream in the particle formation vessel and the temperature of the compressed fluid anti-solvent upstream of the particle formation vessel is at least about 80° C.

5. A method for preparing a substance in particulate form, the method comprising:

introducing into a particle formation vessel, through separate first and second fluid inlets respectively, (a) a solution or suspension of the substance in a fluid and (b) a compressed fluid anti-solvent for the substance; and allowing the compressed fluid anti-solvent to extract the fluid from the solution or suspension to form particles of the substance;

wherein the compressed fluid anti-solvent has a sonic, near-sonic or supersonic velocity as it enters the particle formation vessel, the compressed fluid anti-solvent and the solution or suspension enter the particle formation vessel at different locations and meet downstream in the particle formation vessel, and the solution or suspension comprises two or more fluids which are mixed in situ at or immediately before their contact with the compressed fluid anti-solvent.

6. A method according to claim 5, wherein the two or more fluids each carry one or more substances that are to be combined in the particle formation vessel.

7. A method for preparing a substance in particulate form, the method comprising:

introducing into a particle formation vessel, through separate first and second fluid inlets respectively, (a) a solution or suspension of the substance in a fluid and (b) a compressed fluid anti-solvent for the substance; and allowing the compressed fluid anti-solvent to extract the fluid from the solution or suspension to form particles of the substance;

wherein the compressed fluid anti-solvent has a sonic, near-sonic or supersonic velocity as it enters the particle formation vessel, the compressed fluid anti-solvent and the solution or suspension enter the particle formation vessel at different locations and meet downstream in the particle formation vessel and the solution or suspension is introduced directly into the flow of the compressed fluid anti-solvent.

8. A method for preparing a substance in particulate form, the method comprising:

introducing into a particle formation vessel, through separate first and second fluid inlets respectively, (a) a solution or suspension of the substance in a fluid and (b) a compressed fluid anti-solvent for the substance; and allowing the compressed fluid anti-solvent to extract the fluid from the solution or suspension to form particles of the substance;

wherein the compressed fluid anti-solvent has a sonic, near-sonic or supersonic velocity as it enters the particle formation vessel, the compressed fluid anti-solvent and the solution or suspension enter the particle formation vessel at different locations and meet downstream in the particle formation vessel, the first fluid inlet is located vertically below the second fluid inlet, and the compressed fluid anti-solvent flows into the particle formation vessel in a vertically downwards direction.

9. A method for preparing a substance in particulate form, the method comprising:

introducing into a particle formation vessel, through separate first and second fluid inlets respectively, (a) a solution or suspension of the substance in a fluid and (b) a compressed fluid anti-solvent for the substance; and allowing the compressed fluid anti-solvent to extract the fluid from the solution or suspension to form particles of the substance;

wherein the compressed fluid anti-solvent has a sonic, near-sonic or supersonic velocity as it enters the particle formation vessel, the compressed fluid anti-solvent and the solution or suspension enter the particle formation vessel at different locations and meet downstream in the particle formation vessel, and at the point where the solution or suspension and the compressed fluid anti-solvent meet, the angle between their axes of flow is between about 70 and about 110°.

10. A method for preparing a substance in particulate form, the method comprising:

introducing into a particle formation vessel, through separate first and second fluid inlets respectively, (a) a solution or suspension of the substance in a fluid and (b) a compressed fluid anti-solvent for the substance; and allowing the compressed fluid anti-solvent to extract the fluid from the solution or suspension to form particles of the substance;

wherein the compressed fluid anti-solvent has a sonic, near-sonic or supersonic velocity as it enters the particle formation vessel, the compressed fluid anti-solvent and the solution or suspension enter the particle formation vessel at different locations and meet downstream in the particle formation vessel, and the particles of the substance have a size distribution with a standard deviation of 2.5 or less.

* * * * *